US012551523B2

(12) United States Patent
Isoda et al.

(10) Patent No.: US 12,551,523 B2
(45) Date of Patent: Feb. 17, 2026

(54) HIF-1 ACTIVATOR

(71) Applicants: NUTRITION ACT CO., LTD., Tokyo (JP); UNIVERSITY OF TSUKUBA, Tsukuba (JP)

(72) Inventors: Hiroko Isoda, Tsukuba (JP); Shinji Kondo, Tsukuba (JP); Farhana Ferdousi, Tsukuba (JP); Masahito Ishikawa, Tokyo (JP); Youko Watanabe, Toyko (JP); Ken Yamauchi, Toyko (JP); Miki Yokozawa, Toyko (JP)

(73) Assignees: NUTRITION ACT CO., LTD., Tokyo (JP); UNIVERSITY OF TSUKUBA, Ibaraki (JP)

( * ) Notice: Subject to any disclaimer, the term of this patent is extended or adjusted under 35 U.S.C. 154(b) by 402 days.

(21) Appl. No.: 17/959,584

(22) Filed: Oct. 4, 2022

(65) Prior Publication Data
US 2023/0113829 A1 Apr. 13, 2023

(30) Foreign Application Priority Data

Oct. 5, 2021 (JP) ................................. 2021-164352
Oct. 3, 2022 (JP) ................................. 2022-159727

(51) Int. Cl.
| | | |
|---|---|---|
| A61K 36/00 | (2006.01) | |
| A23L 33/105 | (2016.01) | |
| A61K 8/9789 | (2017.01) | |
| A61K 31/7048 | (2006.01) | |
| A61K 36/63 | (2006.01) | |
| A61P 7/06 | (2006.01) | |
| A61Q 19/00 | (2006.01) | |
| C12N 5/0789 | (2010.01) | |

(52) U.S. Cl.
CPC ............ *A61K 36/63* (2013.01); *A23L 33/105* (2016.08); *A61K 8/9789* (2017.08); *A61K 31/7048* (2013.01); *A61P 7/06* (2018.01); *A61Q 19/00* (2013.01); *C12N 5/0647* (2013.01); *A23V 2002/00* (2013.01); *A61K 2800/10* (2013.01)

(58) Field of Classification Search
CPC .................................................... A61K 36/63
See application file for complete search history.

(56) References Cited

U.S. PATENT DOCUMENTS

| | | | | |
|---|---|---|---|---|
| 2007/0009620 A1* | 1/2007 | Aoki | ........................ | A61P 9/14 424/769 |
| 2012/0141435 A1* | 6/2012 | Quesada Gomez | ...... | A61P 1/04 514/27 |
| 2018/0169170 A1* | 6/2018 | Yagyu | .................. | A23L 33/105 |
| 2019/0261668 A1* | 8/2019 | Tzeghai | ................. | A23L 33/15 |

FOREIGN PATENT DOCUMENTS

| | | | |
|---|---|---|---|
| CN | 104127469 B | * | 8/2018 |
| KR | 2021030840 A | * | 3/2021 |

OTHER PUBLICATIONS

Marcos et al, Development of biodegradable films with antioxidant properties based on polyesters containing α-tocopherol and olive leaf extract for food packaging applications. Food packaging and shelf life (2014), vol. 1, No. 2, pp. 140-150 (Year: 2014).*
Huang, I.E. et al; Regulation of hypoxia-inducible factor 1α is mediated by an $O_2$-dependent degradation domain via the ubiquitin-proteasome pathway; Proc. Natl. Acad. Sci. USA; Jul. 1998; vol. 95, Previously presented. 7987-7992.
Kondo, S., et al; Comprehensive transcriptome analysis of erythroid differentiation potential of olive leaf in haematopoietic stem cells; J. Cell Mol. Med .; DOI:10.1111/jcmm.16752; Aug. 2021; 7229-7243.
Masson, N., et al; HIF prolyl and asparaginyl hydroxylases in the biological response to intracellular $O_2$ levels; J. Cell Sci., Aug. 1, 2003; vol. 116; 3041-3049.
Sakamoto, K., Blood Flow Restricted Training—Skeletal muscle ischemic preconditioning; Folia Pharmacol. Jpn. 150; 2017; 201-203.
Semenza, G.L.; Regulation of Mammalian $O_2$ Homeostases by Hypoxia-Inducible Factor 1; Annu. Rev. Cell Dev. Biol.; 1999; 15:551-78.
Wang, Y., et al; The hypoxia-inducible factor a pathway couples angiogenesis to osteogenesis during skeletal development; J. Clin. Invest.; 2007; vol. 117; 1616-1626.

* cited by examiner

*Primary Examiner* — Qiuwen Mi
(74) *Attorney, Agent, or Firm* — Kilpatrick Townsend & Stockton LLP

(57) ABSTRACT

The invention provides an HIF-1 activator for treatment, prevention, alleviation, improvement or recovery from diseases or symptoms associated with reduced HIF-1 activity, as well as a pharmaceutical composition, cosmetic and food composition comprising the activator. Provided is an HIF-1 activator comprising olive leaf extract. Also provided is an HIF-1 activator which is for maintaining the undifferentiated state of stem cells via HIF-1 activation and/or improving dysdifferentiation of stem cells.

22 Claims, 16 Drawing Sheets

Specification includes a Sequence Listing.

RBC, ×10⁴/μL

Hemoglobin, g/dl

HIF-1 ACTIVATOR

CROSS-REFERENCE TO RELATED APPLICATIONS

The present application claims the benefit of priority to Japanese Patent Application No. 2022-159727, filed Oct. 3, 2022, and Japanese Patent Application No. 2021-164352, filed Oct. 5, 2021, the contents both of which are incorporated by reference in their entireties for all purposes.

FIELD

The present invention relates to an HIF-1 activator comprising olive leaf extract, and more specifically it relates to an HIF-1 activator or a differentiation inducer for inducing differentiation of stem cells based on HIF-1 activation, using olive leaf extract or a component contained in it.

BACKGROUND

HIF-1 (Hypoxia-Inducible Factor-1) is a transcription inducing factor that, as a major regulator of oxygen homeostasis, initiates expression of a variety of genes involved in vascularization, erythropoiesis, glycolysis and cancer metastasis (NPL 1). HIF-1 is composed of HIF-1α and HIF-1β, the HIF-1α component being rapidly decreased by the ubiquitin-proteasome system under normal oxygen conditions, and the level of HIF-1β being kept constant (NPL 2).

Expression and transcription activity of HIF-1 are markedly increased when the intracellular oxygen concentration decreases. Identified target genes transactivated by HIF include genes coding for VEGF (vascular endothelial growth factor), erythropoietin (EPO), glucose transporter and glycolytic enzymes (see NPL 3). By comprehensive transcriptome analysis of gene expression, the present inventors have elucidated the molecular mechanism of hematopoiesis whereby differentiation of hematopoietic stem cells to erythrocytes is induced via signaling of EPO or VEGF and GATA-1, as a result of HIF-1α activation (NPL 4).

It is also known that HIF-1α activation is associated with various physiological effects independent of its hematopoietic action, such as skeletal muscle enlargement (NPL 5) or osteogenesis promotion (NPL 6).

The present inventors have previously reported that polyphenol compounds in olive or *Ligustrum obtusifolium* leaves (compounds such as oleuropein) notably improve or increase brain function by usage in tandem with triterpenes present in black chokeberry fruit (PTL 1). However, it has not been reported that the oleuropein in olive leaves induces HIF-1.

CITATION LIST

Patent Literature

[PTL 1] Japanese Unexamined Patent Publication No. 2017-178914

Non Patent Literature

[NPL 1] Masson N. and Ratcliffe P. J., J. Cell Sci., vol. 116, p.3041-3049, 2003
[NPL 2] Huang L. E., et al., Proc. Natl. Acad. Sci. USA, vol. 95. p.7978-7992, 1998
[NPL 3] Semenza, G. L., Ann. Rev. Cell. Dev. Biol., vol. 15: p.551-578, 1999
[NPL 4] Kondo, S. et al., J. Cell Mol. Med., DOI; 10.1111/jcmm.16752
[NPL 5] Sakata K., J. Japan Pharm. Assoc., Vol. 150, pp.201-203, 2017
[NPL 6] Ying Wang, et al., J. Clin. Invest., vol. 117, p.1616-1626

SUMMARY

Technical Problem

It is an object of the present invention to provide an HIF-1 activator for treatment, prevention, alleviation, improvement or recovery from diseases or symptoms of reduced HIF-1 activity, as well as a pharmaceutical composition, cosmetic and food composition comprising the activator.

Solution to Problem

As a result of much research by the present inventors with the aim of solving the problems described above, it was found that a mixture of olive leaf extract with oleuropein and oleuroside causes HIF-1 activation, and the present invention was thereupon completed.

Specifically, the aspects of the present invention include, but are not limited to, the following.

[1] An HIF-1 activator comprising olive leaf extract.

[2] The HIF-1 activator according to [1], which is for maintaining the undifferentiated state of stem cells via HIF-1 activation and/or improving dysdifferentiation of stem cells.

[3] The HIF-1 activator according to [1], which is for inducing and/or promoting differentiation of pluripotent stem cells or multipotent stem cells via HIF-1 activation.

[4] The HIF-1 activator according to [1], which is for maintaining the undifferentiated state of pluripotent stem cells or multipotent stem cells via HIF-1 activation, and/or promoting their self-replication.

[5] The HIF-1 activator according to [3] or [4], wherein the pluripotent stem cells are selected from the group consisting of somatic stem cells, embryonic stem cells (ESC), induced pluripotent stem cells (iPSC) and embryonic germ cells (EGC).

[6] The HIF-1 activator according to [5], wherein the somatic stem cells are selected from the group consisting of hematopoietic stem cells, skin stem cells, epidermal stem cells, dermal stem cells, neural stem cells, mesenchymal stem cells, hepatic stem cells and pancreatic stem cells.

[7] The HIF-1 activator according to any one of [1] to [6], which is for treatment, prevention, alleviation, improvement or recovery from a disease or a symptom associated with reduced HIF-1 activity.

[8] The HIF-1 activator according to [7], wherein the disease or symptom is selected from the group consisting of diseases or symptoms associated with hematopoietic dysfunction, diseases or symptoms associated with hypoxia response dysfunction, diseases or symptoms associated with impaired vascularization ability, ischemic brain disease and ischemic heart disease.

[9] The HIF-1 activator according to any one of [1] to [8], which is for promoting and/or improving hematopoiesis, vascularization, vascular function, iron metabolism homeostasis and oxygen transportability.

[10] The HIF-1 activator according to any one of [1] to [9], which is for treatment, prevention, alleviation and/or improvement of a symptom selected from the group consisting of anemia, iron deficiency, irregular menstruation, breathlessness, fatigue, malaise, dizziness, lightheadedness, heavyheadedness, headache, skin tone darkening and hypobaropathy, by increased oxygen transportability associated with increased erythrocytes based on activation of hematopoietic stem cells by HIF-1 activation.

[11] The HIF-1 activator according to any one of [1] to [10], which is for treatment, prevention, alleviation and/or improvement in a symptom selected from the group consisting of poor blood circulation, blood stagnation, dull complexion, menstrual pain, nail abnormality, restless leg syndrome, swelling, low back pain, shoulder stiffness, arthralgia, cold sensitivity, alopecia, delayed wound healing, constipation, dark eye circles, dull complexion, skin spots, wrinkles, reduced skin elasticity, impaired skin barrier function and blushing, which is associated with improved vascularization and vascular function based on activation of stem cells by HIF-1 activation.

[12] The HIF-1 activator according to any one of [1] to [11], which is for improvement of a symptom selected from the group consisting of skin aging, sarcopenia, osteoporosis, osteoarthritis and brain aging, based on activation of stem cells by HIF-1 activation.

[13] The HIF-1 activator according to any one of [1] to [12], which is for treatment, prevention, alleviation and/or improvement in a symptom selected from the group consisting of brain aging associated with increased age or reduced cerebral blood flow, cognitive decline, impaired memory, forgetfulness, mild cognitive impairment, dementia, poor concentration, age-associated brain atrophy, reduced cranial neuronal ATP levels, decreased neurogenesis, Creutzfeldt-Jakob disease, Alzheimer's disease, Huntington's disease, Lewy body disease, Parkinson's disease, Pick's disease, amyotrophic lateral sclerosis, neurofibromatosis, epilepsy, brain damage, stroke, multiple sclerosis, ischemic hypoxia, spinal cord injury, loss of memory and multi-infarct dementia, based on activation of neural stem cells.

[14] The HIF-1 activator according to any one of [1] to [13], wherein the olive leaf extract includes either or both oleuropein and oleuroside, and/or their derivative, as an active ingredient.

[15] The HIF-1 activator according to any one of [1] to [14], which comprises oleuropein or its derivative and oleuroside or its derivative at 100:1 to 1:100 (weight ratio).

[16] A pharmaceutical composition comprising an HIF-1 activator according to any one of [1] to [15].

[17] A cosmetic comprising an HIF-1 activator according to any one of [1] to [15].

[18] A food composition comprising an HIF-1 activator according to any one of [1] to [15].

Advantageous Effects of Invention

By using an HIF-1 activator comprising olive leaf extract according to the invention it is possible to induce differentiation of stem cells based on HIF-1 activation, while also maintaining the undifferentiated state of stem cells and improve dysdifferentiation of stem cells, and to thus help with treatment or prevention of various diseases that are based on HIF-1 activation.

DESCRIPTION OF EMBODIMENTS

Figure 1:
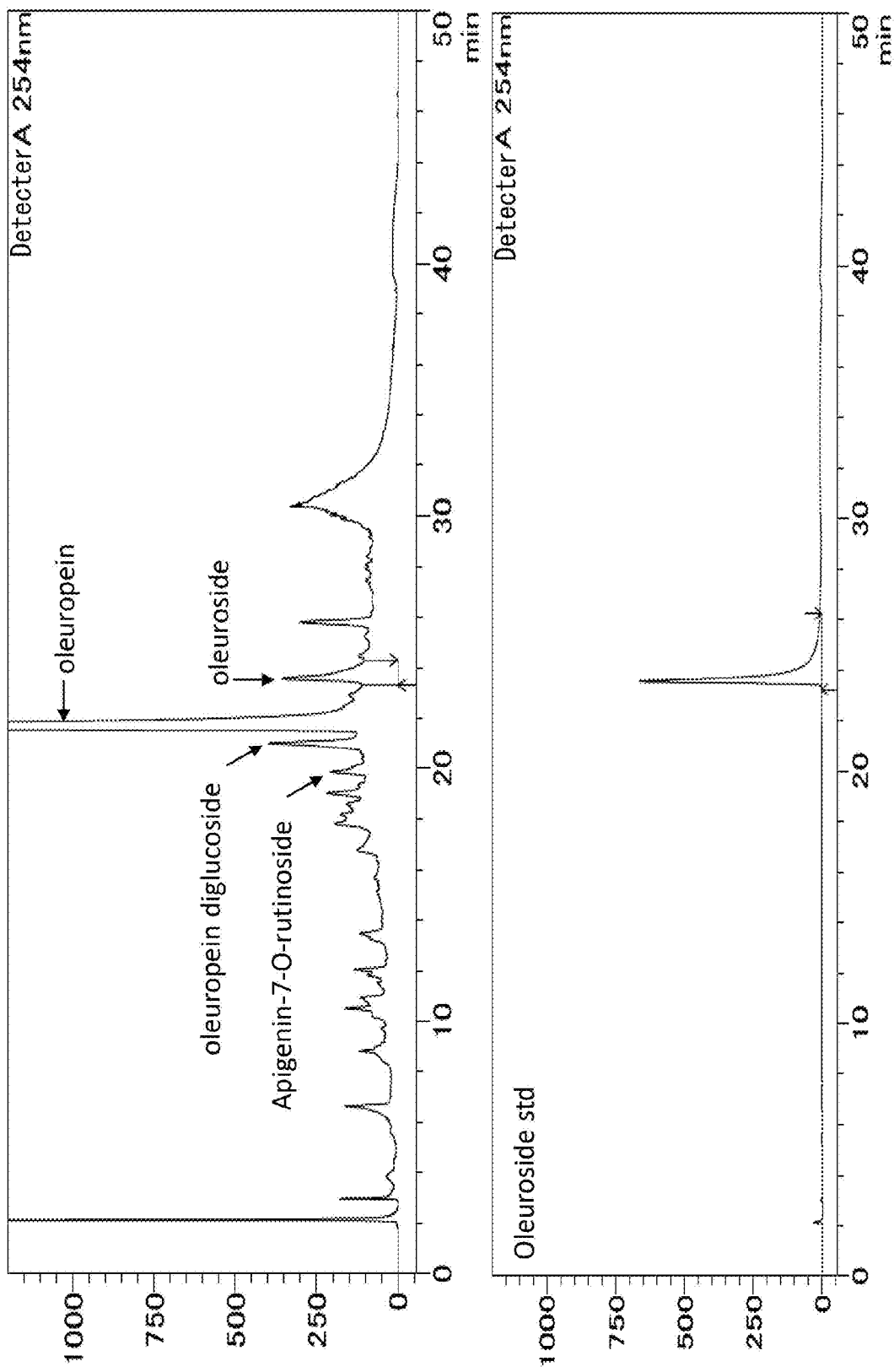
FIG. 1 shows an example of results of component analysis of olive leaf extract powder.

Embodiments of the invention will now be explained in detail.

1. HIF-1

Hypoxia-inducible factor-1 (HIF-1) (also known as "HIF transcription complex") is involved in tumor progression by up-regulation of key genes related to metabolic adaptation, glycolysis (glucose transporter, GLUT1 and glycolytic enzymes) proliferation (insulin-like growth factor-1 and -2), and vascularization (VEGF and erythropoietin). HIF-1 is a dimer transcription factor comprising a regulated α subunit and a constitutively-expressed β subunit. HIF-α protein has an extremely short half-life. Under normal oxygen partial pressure, the proline residue of HIF-α protein is hydroxylated by proline hydroxylase (PHD). Proline residue-hydroxylated HIF-α binds with ubiquitin ligase complex that includes Von Hippel-Lindau protein. As this occurs, HIF-α is ubiquitinated and HIF-α is subsequently degraded in the proteasome. In a low-oxygen environment, on the other hand, PHD enzyme activity is reduced, causing this series of reactions to halt. As a result, degradation of HIF-α is inhibited, promoting formation of HIF-α and HIF-β complexes. HIF-α and HIF-β complex is known to bind with Hypoxia Responsive Element (HRE) to function as a transcription factor. The present invention provides an HIF-1 activator.

When exposed to low oxygen, cells generally undergo changes in intracellular metabolism and gene expression in response to the lower level of oxygen, leading to their damage. HIF-1 transcription factor plays a central role in regulation of such gene expression, and efficient activation of HIF-1 is very important for the hypoxic stress response (Semenza, G. L., Trends Mol. Med., vol. 7, p.345-50, 2001). Reduced oxygen partial pressure increases the stability of constitutively expressed HIF-1 protein, resulting in higher intracellular HIF-1 protein levels. HIF-1 that has migrated to the nucleus binds with the hypoxia-responsive region of a responsive gene cluster and induces gene expression on the transcription level.

HIF-1 was found to be a transcription activator for erythropoietin (EPO) which regulates red blood cell production, and HIF-1 binding sites were later discovered on the promoter regions of vascular endothelial growth factor (VEGF), enolase 1, transferrin and aldolase A (Wenger, R. H. and Gassmann, M., Biol. Chem., vol. 378, p.609-616, 1997). It is also known to be involved in regulation of expression of gene groups associated with energy production, such as glucose transporters and glycolytic pathway metabolic enzymes.

HIF-1 activation (or stabilization) is also known to be associated not only with hematopoiesis but also with skeletal muscle hypertrophy (Sakamoto, K., J. Japan Pharm. Assoc., Vol. 150, p.201-203, 2017), sarcopenia prevention and treatment (Ishii, N., Functional Food Research, vol. 14, p.88-98, 2018; Julia von Maltzahn, et al., Natl. Cell Biol., vol. 14, p.186-191, 2012), promotion of osteogenesis (Ying Wang, et al., J. Clin. Invest., vol. 117, p.1616-1626), chondrocyte activity and function maintenance in low-oxygen environments (Yudo K., Inflammation and Regeneration, vol. 25, p.164-168, 2005), brain aging and ischemic brain disease (Y. Avramovich-Tirosh, et al., Current Alzheimer Research, vol. 7, p.300-306, 2010; Ago, T., Rinsho Shinkeigaku, Vol. 59, p.707-715, 2019; Takizawa, S. et al., Rinsho Shinkei, Vol. 52, p.911-912, 2012), ischemic heart disease (Huan-Xin Zhao, et al., Basic Res. Cardiol., vol. 105, p.109-118, 2010; Michel R. Hoenig, et al., Current Molecular Medicine, vol. 8, p.754-767, 2008) and anti-aging medicines (Ranjana Mehta, et al., Science, vol. 324, p.1196-1198, 2009; Ara B. Hwang and Seung-Jae Lee, Aging, vol. 3, p.304-310, 2011).

2. HIF-1 Activator

According to the invention it is possible to use an HIF-1 activator comprising olive leaf extract, or oleuropein and oleuroside which are present in olive leaf extract, or their derivatives, to control various events associated with HIF-1 activation. The term "HIF-1 activator" as used herein refers to substances, compounds or their derivatives that function for activation of different types of intracellular signaling originating with HIF-1. Another aspect of the HIF-1 activator of the invention is the ability to induce stem cell differentiation and gene expression via HIF-1 activation. Therefore, the term "HIF-1 activation" as used herein is not limited to the aforementioned definition and encompasses any active involvement in numerous events related to stem cell differentiation.

(1) Olive Leaf Extract

The olive leaf extract used in the HIF-1 activator of the invention is an extract separated from leaves of olive (*Olea europea* L.) by the extraction method described below. Separation may be carried out from all or parts of the olive leaves using an extraction solvent, or separation may be by pressing. As explained below, the olive leaf extract to be used for the invention comprises oleuropein (OP) and oleuroside (OS) which exhibit a synergistic effect on HIF-1 activation, but there is no particular restriction so long as it is olive leaf extract containing OP and OS, or olive leaf as the starting material. A typical example of the invention, as in Example 1 described below, uses olive leaves imported from the olive-producing country Tunisia which is a world-leading producer of olive leaves, but a person skilled in the art will not be restricted to the manner of import, use and processing described herein.

The extraction solvent used may generally be water, an organic solvent (such as one or more solvents selected from among alcohol and acetone, or a mixture of two or more of the same), or a liquid mixture of water and an organic solvent. It is preferred to use water, a liquid mixture of water and an alcohol, or an alcohol. The alcohol may be ethanol or methanol. The extraction time and temperature may be set as appropriate depending on the site of extraction of the olive leaf extract and the type of solvent used. The olive leaf extract may be a crude extract obtained from olive leaves, or it may be obtained by processing, such as concentration, drying and pulverizing of the crude extract. It may also have the impurities removed by treatment using a partition method, or purifying treatment (such as adsorption with an ion exchange resin or column followed by elution with a solvent, and subsequently concentration if necessary).

According to the invention, the olive leaf extract may be used directly as an HIF-1 activator, but may also be diluted as necessary and appropriate.

An example of olive leaf extract is water extract from olive leaves harvested in the Siliana Governorate of Tunisia. HPLC Analysis of the components in this extract yielded the average contents for the components as listed in Table 1.

[Table 1]

TABLE 1

Components in olive leaf water extract (WOL) and their averages, according to detection by HPLC

| Component | Content (mg/g dry weight) |
| --- | --- |
| Apigenin | 0.711 |
| Apigenin-7-O-glucoside | 1.763 |
| Hydroxytyrosol | 3.569 |
| Luteolin | 1.588 |
| Luteolin-7-O-glucoside | 30.590 |
| Oleuropein | 159.250 |
| Oleuroside | 23.57 |

Upon verifying analysis as in the Examples described below, the present inventors found that a combination of oleuropein and oleuroside, from among components in olive leaf extract, exhibit notable effects of HIF-1 activation (particularly HIF-1a activation). According to the invention, the olive leaf extract preferably contains oleuropein at 1 wt % or greater and oleuroside at 0.1 wt % or greater.

(2) Oleuropein and its Derivatives

The oleuropein in the HIF-1 activator of the invention is not restricted to a naturally-derived extract and may be a commercial product or one obtained by chemical synthesis.

As known to those skilled in the art, "oleuropein" is a type of polyphenol component found in olives. Oleuropein alone has been noted for its antiviral activity, antiprotozoan activity and antibacterial activity, and it is also known to have an effect of inducing catecholamine. However, oleuropein has not been known to promote HIF-1 activation in combination with oleuroside, as explained below.

The oleuropein to be used for the invention has the structure represented by the following formula (I):

[Chemical Formula 1]

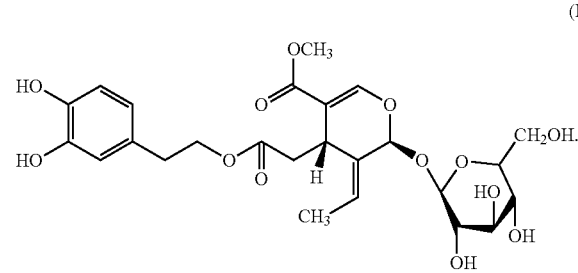

(I)

According to the invention there is no limitation to oleuropein itself, and a derivative thereof may be used. The term "oleuropein derivative" as used herein means a compound that works with oleuroside in vitro and/or in vivo to exhibit essentially the same HIF-1 activation as the oleuropein represented by formula (I) above. Specifically, it may be a compound obtained from oleuropein by an in vivo reaction such as oxidation/reduction, hydrolysis/dehydration, methylation/demethylation, esterification or decarboxylation reaction.

(3) Oleuroside and its Derivatives

The oleuroside in the HIF-1 activator of the invention is not restricted to a naturally-derived extract and may be a commercial product or one obtained by chemical synthesis. Virtually no previous reports exist examining the activity and function of oleuroside in detail, though it is known to significantly increase ATP production in SY5Y-APP_695 cells, for example, while not affecting mitochondria activity (Rekha Grewal, et al., Exp. Neurol, 2020 February 18:113248). However, oleuroside has not been known to promote HIF-1 activation in combination with oleuropein, as explained below.

The oleuroside to be used for the invention has the structure represented by the following formula (II).

[Chemical Formula 2]

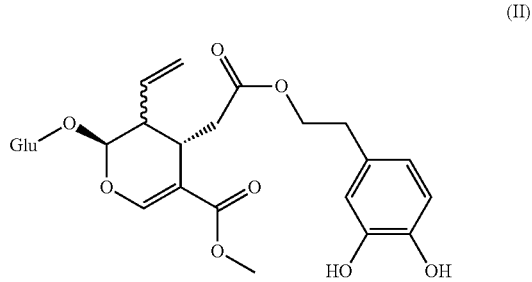

(II)

According to the invention there is no limitation to oleuroside itself, and a derivative thereof may be used. The term "oleuroside derivative" as used herein means a compound that works with oleuropein in vitro and/or in vivo to exhibit essentially the same HIF-1 activation as the oleuroside represented by formula (II) above. Specifically, it may be a compound obtained from oleuroside by an in vivo reaction such as oxidation/reduction, hydrolysis/dehydration, methylation/demethylation, esterification or decarboxylation reaction.

(4) Composition (Mixture) of Oleuropein and Oleuroside

The HIF-1 activator of the invention is a composition comprising oleuropein and oleuroside. It has not been previously reported that a composition comprising oleuropein and oleuroside has action of notably promoting hematopoiesis, or regarding it use for treatment, prevention, alleviation, improvement or recovery from diseases or symptoms associated with reduced HIF-1 activity. The compositional ratio (proportion) of oleuropein and oleuroside in the composition of the invention may be any suitable ratio, such as 5:95 to 95:5 (weight ratio), 10:90 to 90:10 (weight ratio), 15:85 to 85:15 (weight ratio), 20:80 to 80:20 (weight ratio), 30:70 to 70:30 (weight ratio), 40:60 to 60:40 (weight ratio), 50:50 to 50:50 (weight ratio), 60:40 to 40:60 (weight ratio), 70:30 to 30:70 (weight ratio), 80:20 to 20:80 (weight ratio), 85:15 to 15:85 (weight ratio), 90:10 to 10:90 (weight ratio) or 95:5 to 5:95 (weight ratio). Preferred compositional ratios are 100:1 to 1:100 (weight ratio), 50:1 to 1:50 (weight ratio), 30:1 to 1:30 (weight ratio), 20:1 to 1:20 (weight ratio) and 10:1 to 1:10 (weight ratio). The ratios within these ranges are not restricted, and may be 100:1, 90:1, 80:1, 70:1, 60:1, 50:1, 40:1, 30:1, 20:1, 15:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:15, 1:20, 1:30, 1:50, 1:60, 1:70, 1:80, 1:90 or 1:100 (weight ratio), for example.

According to another aspect, the total amount of the oleuropein and oleuroside in the composition of the invention may be 1 wt % or greater. It is preferably 2 wt % or greater, more preferably 3 wt % or greater, even more preferably 4 wt % or greater and yet more preferably 5 wt % or greater. The content of oleuropein in the composition of the invention may be 1 wt % or greater, such as 1, 2, 3, 4, 5, 6, 7, 8, 9, 10, 15, 20, 30, 40, 50, 60, 70, 80 or 90 wt % or greater. The content of oleuroside in the composition of the invention may be 0.1 wt % or greater, such as 1, 2, 3, 4, 5, 6, 7, 8, 9, 10, 15, 20, 30, 40, 50, 60, 70, 80 or 90 wt % or greater. As explained below, the composition of the invention comprising oleuropein and oleuroside in a prescribed ratio is characterized by promoting the physiological activity, and specifically HIF-1 activation, of oleuropein and oleuroside, as compared to either administration of oleuropein alone or administration of oleuroside alone.

The method of producing the composition of the invention is not particularly restricted, and as an example, the composition of the invention may be produced by mixing single oleuropein and oleuroside products in the desired proportion. The single oleuropein and oleuroside products may be natural or obtained by extraction from predetermined starting materials. A person skilled in the art can also obtain their derivatives by known methods. Single products can be obtained by other appropriate methods.

According to another aspect, the composition of the invention can be obtained by calculating the weight ratio of both components in a starting mixture containing oleuropein and oleuroside, and adding single products of oleuropein and oleuroside to the mixture until reaching the predetermined compositional ratio, or by adding a mixture containing either or both oleuropein and oleuroside in a greater amount than the other.

For the purpose of the invention, the composition of oleuropein and oleuroside in the starting mixture and in the composition of the invention can be easily calculated by a known analysis method such as high-performance liquid chromatography (HPLC).

3. Function and Effect of HIF-1 Activator

According to the invention, it is possible to promote a variety of physiological activities based on HIF-1 activation, by applying olive leaf extract either in an HIF-1 activator or as an HIF-1 activator, to cells, tissue and organs of a living body. According to one embodiment, the HIF-1 activator of the invention maintains the undifferentiated state of stem cells, improves their dysdifferentiation, induces their differentiation or induces their activity, and/or promotes their self-replication.

(1) Promoting Differentiation of Stem Cells

The HIF-1 activator of the invention can induce differentiation of stem cells. The term "stem cells" includes, but is not limited to, undifferentiated cells, defined by both the ability to self-replicate for production of progeny cells and the ability to differentiate on the single cell level, such as self-replicating progenitors and non-replicating progenitors, as well as final differentiated cells. For example, "stem cells" may include (a) totipotent stem cells; (b) pluripotent stem cells; (c) multipotent stem cells; (d) oligopotent stem cells; and (e) unipotent stem cells.

The term "totipotent" as used herein refers to cells that have the ability to generate all cells and extraembryonic tissue in a body, such as placenta. A fertilized egg (zygote) is totipotent since it consists of cells of the morula (up to the 16-cell stage after fertilization) (blastomere).

The term "pluripotent stem cells" refers to stem cells having the ability to differentiate into cells of a variety of tissues (pluripotent differentiating power). Pluripotent stem cells include somatic stem cells, embryonic stem cells (ESC), induced pluripotent stem cells (iPSC) and embryonic germ cells (EGC), without being limitative. Any publicly known pluripotent stem cells may be used, such as the pluripotent stem cells described in International Patent Publication No. WO2009/123349.

The term "somatic (tissue) stem cells" refers to stem cells that are cell lines capable of differentiation but only to limited specific tissues, though having the ability to differentiate into a variety of cell types (pluripotent differentiating power). For example, hematopoietic stem cells in the bone marrow are the source of blood cells, while neural stem cells differentiate into neurons. Additional types include hepatic stem cells from which the liver is formed and skin stem cells that form skin tissue. Examples of somatic stem cells include hematopoietic stem cells, skin stem cells, epidermal stem cells, dermal stem cells, neural stem cells, mesenchymal stem cells, hepatic stem cells and pancreatic stem cells.

The term "embryonic stem cells (ESC)" refers to stem cells that derive from the inner cell mass of an early embryo, known as a blastocyst (also referred to herein as "ES cells"). ES cells can differentiate into different derivatives which are the three different types of primary blastoderm, the ectoderm, endoderm and mesoderm.

The term "induced pluripotent stem cells (iPSC)" refers to cells that have been reprogrammed into cells that can differentiate into the mesoderm, endoderm and ectoderm tissue (also referred to herein as "iPS cells").

The term "embryonic germ cells (EGC)" refers to cells that have the ability to self-replicate and can differentiate to produce various types of cells of the body, or in other words, germ cells and germ cell progenitors, such as primordial germ cells, i.e. cells that are to form sperm and ova (also referred to herein as "EG cells").

The term "multipotent stem cells" refers to cells that have the ability to differentiate into one or more blastoderm cells, but do not have the ability to differentiate into all three blastoderm types. Multipotent cells may also be referred to as "partially differentiated cells". Multipotent cells are known in the technical field, with examples of multipotent cells including adult stem cells such as hematopoietic stem cells and neural stem cells. The term "multipotent" means that the cells are able to form many cell types of the line but cannot form cells of other lines. For example, multipotent hematopoietic cells are able to form many different types of blood cells (erythrocytes, leukocytes and platelets), but cannot form neurons. The term "multipotency" therefore refers to a state of cells with lesser ability than totipotency and pluripotency.

The term "oligopotent progenitor" refers to stem cells having the ability to differentiate only into a few cell types, such as lymphoblasts or myeloid progenitor cells. The term "unipotent stem cells" refers to stem cells having the ability to differentiate only into a specific tissue or cells.

The term "differentiate" or "cell differentiation" refers to formation of cells having specific morphological and functional traits by division from undifferentiated cells without specific morphological and functional traits. During the process of differentiation, specific genes are expressed that were not expressed in the undifferentiated cells. Such gene expression is also included in the concept of "differentiation". The term "induce differentiation" means that cells having specific morphological and functional traits are produced from undifferentiated cells. Expression of specific genes not expressed in undifferentiated cells is also included in the concept of "inducing differentiation".

(2) Self-Replication and Maintenance of Undifferentiated State of Stem Cells

The HIF-1 activator of the invention can promote self-replication of and maintain the undifferentiated state of stem cells. The term "stem cells" includes, but is not limited to, undifferentiated cells, defined by both the ability to self-replicate for production of progeny cells and the ability to differentiate on the single cell level, such as self-replicating progenitors and non-replicating progenitors, as well as final differentiated cells. For example, "stem cells" may include (a) totipotent stem cells; (b) pluripotent stem cells; (c) multipotent stem cells; (d) oligopotent stem cells and (e) unipotent stem cells.

The term "self-replication" refers to formation of daughter cells having traits that are morphologically and functionally equivalent to those of mother cells by cell division from undifferentiated cells without specific morphological and functional traits. The phrase "maintenance of undifferentiated state" means that the undifferentiated cells are kept in a non-differentiated state.

(2) Treatment of Diseases Associated with HIF-1 Activation

According to the invention it is possible to treat, prevent, alleviate, improve or lead to recovery from a disease or symptoms associated with reduced HIF-1 activity. The term "treating", "treat" or "treatment" as used herein refers to a therapeutic intervention, behavior or protocol which leads to at least improvement in the symptoms of a disease, disorder or condition at least after those symptoms have appeared. The term "preventing", "prevent" or "prevention" refers to a therapeutic intervention, behavior or protocol which is begun before onset of symptoms of a disease, disorder, condition, so as to prevent, inhibit or retard onset or progression of the disease, disorder, condition or symptoms.

The term "recovering", "recover" or "recovery" means restoring the function of an unhealthy subject (for example, an individual with a disease, or a tissue or cells from the individual) to a level that is equivalent to or higher than the corresponding function of a normal subject (for example, a healthy subject or a tissue or cells from the subject). The term "alleviating", "alleviate" or "alleviation" refers to reduction in the severity or frequency of at least one symptom of a disease or disorder of a subject.

The diseases or symptoms that are the target of treatment with the HIF-1 activator of the invention are not limited and include diseases or symptoms associated with hematopoietic dysfunction, diseases or symptoms-associated with hypoxia response dysfunction, diseases or symptoms associated with impaired vascularization ability, or skin aging, sarcopenia, osteoporosis, osteoarthritis, brain aging, ischemic brain disease, ischemic heart disease, blood stagnation, dull complexion and skin tone darkening.

The HIF-1 activator of the invention can treat, prevent, alleviate, improve or lead to recovery from diseases or symptoms associated with hematopoietic dysfunction, and can promote hematopoiesis. The term "hematopoietic dysfunction" includes reduction in myeloid, erythroid, lymphocyte or megakaryocyte cells of the hematopoietic system, or a combination thereof, examples of which include inherited or acquired genetic defects, or hematopoietic insufficiency or hematopoietic toxicity, resulting in anemia or immune deficiency, of an erythroid cell line, granulocyte cell line, macrophage cell line, megakaryocyte cell line or lymphocyte cell line. More specific examples include sickle cell anemia, hypoplastic anemia, myelodysplastic syndrome, accidental exposure to radiation, and life-threatening autoimmune disease such as lupus.

In regard to hematopoietic action, the present inventors have previously demonstrated, based on comprehensive transcriptome analysis of gene expression, that HIF-1 activation (or stabilization) leads to EPOR activation, ribosome biosynthesis activation and GATA-1 activation in that order, and acceleration of hematopoietic action (differentiation to erythroblasts, differentiation to reticulocytes, differentiation to erythrocytes and increase in hemoglobin) (see Kondo, S., et al., J. Cell Mol. Med., DOI; 10.1111/jcmm.16752).

The term "hematopoiesis", as used herein, generally refers to the process of cell differentiation or formation of specific specialized blood cells from hematopoietic stem cells. The term "hematopoietic stem cells (HSC)" may be either pluripotent stem cells or multipotent stem cells that produce various blood cell types, such types including myeloid lines (for example, monocytes and macrophages, neutrophils, basophils, eosinophils, erythrocytes, megakaryocytes/platelets and dendritic cells) and lymphocyte lines (for example, T cells, B cells and NK cells), as well as other lines known in the technical field. A "stem cell" is typically defined by its ability to form multiple cell types (such as pluripotency) and its self-regenerative power.

The "hematopoietic action" is not limited and may be improvement or prevention of anemia, improvement or prevention of iron deficiency anemia, hemolytic anemia, senile anemia or renal anemia, or prevention of frailty. The term indicates that when an HIF-1 activator is applied to a subject, it increases differentiation from HSC to various blood cell types by at least 1%, 2%, 3%, 4%, 5%, 10%, 15%, 20%, 25%, 30%, 50%, 60%, 70%, 80%, 90% or more, compared to a control to which the HIF-1 activator is not applied. Alternatively, the term indicates that hemoglobin is increased by at least 1%, 2%, 3%, 4%, 5%, 10%, 15%, 20%, 25%, 30%, 50%, 60%, 70%, 80%, 90% or more, compared to the control. According to another aspect, the term indicates that expression of a specific gene in different blood cell types is increased by at least 1%, 2%, 3%, 4%, 5%, 10%, 15%, 20%, 25%, 30%, 50%, 60%, 70%, 80%, 90% or more, compared to the control. As demonstrated in the Examples described below, the HIF-1 activator of the invention can increase erythrocyte counts and increase hemoglobin levels.

According to the invention, HIF-1 activation leads to a VEGF-mediated cascade resulting in dermal granular layer angiogenesis increase→dermal stem cell/epidermal stem cell hypoxia/blood vessel niche improvement→stem cell support/recovery→fibroblast recovery→basal membrane improvement→epidermal cells turnover improvement→improvement in skin barrier, wrinkles and moisture retention and increased blood flow→dull complexion improvement. Homeostasis of the hematopoietic system in mammals is regulated by hematopoietic stem cells present in the bone marrow microenvironment (niche). To prevent cell senescence, hematopoietic stem cells maintain the cell cycle resting stage and metabolic homeostasis, entering the cell cycle at an appropriate timing for division to produce differentiated cells as necessary. This event is controlled by niche cells which form the bone marrow niche, and a low-oxygen environment. Since formation of a low-oxygen environment niche by HIF-1 and a blood vessel niche by vascularization are necessary for stem cell maintenance, improvement in stem cell function is desired by improving the hypoxic niche of hematopoietic stem cells, epidermal stem cells, dermal stem cells, neural stem cells and other tissue stem cells, and the blood vessel niche of stem cells which mediate vascularization.

According to another aspect, the HIF-1 activator of the invention can treat, prevent, alleviate, improve or lead to recovery from a disease or symptoms associated with hypoxia response dysfunction and a disease or symptoms associated with impaired vascularization ability. In regard to the term "hypoxia response dysfunction" as used herein, "hypoxia response" is a defense mechanism from a hypoxic state in a body, while "hypoxia response dysfunction" is a state of reduction in the ability to sense oxygen levels and the response function of corresponding gene expression regulation, which are active in ischemic or low-oxygen environment conditions. In regard to the term "impaired vascularization ability", "vascularization" is formation of new blood vessels from existing blood vessels, while "impaired vascularization ability" is a state of impaired ability to form normal blood vessels due to aging or disease.

(3) Skin Anti-Aging

The term "skin aging" refers to apparent changes in the skin due to aging or light (especially ultraviolet light). Signs of skin aging include wrinkles and fine wrinkles, loose skin, discolored skin (skin tan), thinned skin and skin without luster and/or vitality, as well as lack of elasticity and/or tightness of the skin, and reduced barrier function. Signs of skin aging may also be internal changes in the skin that are not histologically apparent, such as internal decomposition of the skin, and especially collagen decomposition. As used herein, the term "skin anti-aging" is typified by, but not limited to, anti-wrinkle action, moisture retention, texture and skin color improvement, barrier function improvement, elasticity improvement and prevention of stem cell depletion.

Skin aging is related to body metabolism, and stem cell function is known to be regulated by metabolic programming (see Takubo, K., Ryoiki Yugo Review, 2, e012, 2013). It has also been reported that during the wound healing process, reconstitution of the vasoganglion plays a role in regulating division of epidermal stem cells (see Mizutani, K., Cosmetology Kenkyu Hokoku, vol. 27, 2019).

With focus on HIF-1 activation, vascularization is promoted on the dermis level via the VEGF→Ang-1/Tie-2 pathway, the stem cell microenvironment niche is maintained by restoration and maintenance of the basal membrane structure, and HIF-1 is able to restore function of skin stem cells and inhibit depletion to restore the overall state of skin by supporting the necessary low-oxygen environment for maintenance of stem cells. HIF-1 also has effects on maintenance and proliferation of stem cells through pathways other than vascularization. It is known that HIF-1 promotes expression of integrin β1 and laminin 332, promoting homeostasis and restoring senescence of skin by stabilization of the basal membrane (Hamid Reza Rezvani et al., J Cell Sci. vol. 124 (Pt 24):4172-83, 2011), but the epidermal basal membrane also functions as an epidermal stem cell niche by binding with integrin on epidermal stem cells, and is therefore necessary for maintenance and proliferation of stem cells (Hye-Ryung Choi et al., World J Stem Cells. vol. 7(2): 495-501, 2015).

(4) Sarcopenia

The term "sarcopenia" refers to a state of lower muscle mass leading to reduced muscle force or decreased physical function, as a consequence of aging or other factors. A direct effect of hypoxia on muscle cells has been verified, and for example, it is known that inducing differentiation of a C2C12 cell line (cultured mouse skeletal muscle cell line) in vitro results in HIF-1 increase in a normal oxygen environment (Sakamoto, K., J. Japan Pharm. Assoc., Vol. 150, pp. 201-203, 2017). On the other hand, HIF-1 protein is stabilized by transient hypoxia stimulation, and this presumably leads to muscular hypertrophy via the Wnt7a→Fzd7→PI3K→AKT→mTOR→S6K pathway, suggesting a role for HIF-1 in muscular hypertrophy (Sakamoto, K., ibid).

Furthermore, as the mechanism of HIF-1-mediated effects on muscle becomes clearer, it is known in regard to self-replication of stem cells, for example, that HIF-1 activation leads to maintenance of muscle hygiene cells via Notch signaling (Xin Yand, et al., J. Biol. Chem., 10.1074/jbc. M 116.756312). It has also been reported that HIF-1 activation promotes differentiation of hygiene cells via Wnt7a, helping to promote muscle formation (Andrew, S. Brack, et al., Cell Stem Cell, vol. 2, p.50-59, 2008). These findings suggest that Notch and Wnt signals are regulated by crosstalk during this stage, and since homeostasis of muscle cells is supported, that HIF-1 is involved in both the mechanisms of differentiation and replication of muscle hygiene cells.

(5) Osteoporosis

The term "osteoporosis" refers to a condition of lower bone strength and greater risk of bone fracture, and this bone disease is caused by genetic factors, early menopause, drugs and smoking. The molecular mechanism of osteoporosis is gradually being elucidated, and it is known that HIF-1 increases VEGF levels in osteoblasts to accelerate vascularization and osteogenesis (Ying Wang, et al., J. Clin. Invest., vol. 117, p.1616-1626). It is also known to promote ALP activity and production of type I collagen and type III collagen, via Cbfa1, and to promote differentiation of mesenchymal stem cells into an osteogenic line (Jiao Huang, et al., Tohoku J. Exp. Med., vol. 224(1) p.7-12, 2011). The HIF-1 activator specifically promotes differentiation of hematopoietic stem cells to blood progenitor cell lines (MEP), while inhibiting differentiation to progenitor cell lines of monocytes, macrophages and granulocytes (GMP), which are osteoclast progenitor cells. It promotes differentiation to mesenchymal osteoblasts and promotes osteogenesis while inhibiting differentiation to osteoclasts that promote bone resorption in the hematopoietic system (Kondo, S., et al., J. Cell Mol. Med., DOI; 10.1111/jcmm.16752).

(6) Osteoarthritis

The term "osteoarthritis" refers to pain and swelling of the joints due to deterioration of cartilage between bones of the joints, as a degenerative disease eventually leading to deformation of the joints. In connection with HIF-1, it is known that HIF-1 is highly expressed in sites of cartilage degeneration in osteoarthritis, in a manner correlated with the degree of cartilage degeneration, and it has been demonstrated that HIF-1 is a necessary factor for maintenance of chondrocyte activity and function in a low-oxygen environment (Yudo, K., Inflammation and Regeneration, vol. 25, p.164-168, 2005).

(7) Brain Anti-Aging and Ischemic Brain Disease

The term "brain aging" refers to age-associated or reduced cerebral blood flow-associated cognitive decline, impaired memory, forgetfulness, mild cognitive impairment, dementia, poor concentration, age-associated brain atrophy, reduced cranial neuronal ATP levels or decreased neurogenesis. It is known that HIF-1 plays a role in inducing differentiation of and maintaining neural stem cells and that HIF1 expression in neural stem cells is essential for stabilizing the neural stem cell perivascular niche in the adult subventricular zone (SVZ) and supporting neural stem cells, via the HIF-1-VEGF pathway (Lu Li, et al., J. Neurosci., vol. 34(50):16713-16719, 2014), while it is also known that in the context of hypoxia response, HIF-1 inhibits the neural differentiation-suppressing signal BMP4, directly positively regulates expression of the neural differentiation marker Sox1, and positively regulates neural differentiation of mouse embryonic stem cells (Yang, Zhao, et al., Stem Cells Dev. 23(18): 2143-2155, 2014). The term "ischemic brain disease" refers to a disease that occurs due to ischemia in the brain, but it may also be dementia due to cardiogenic cerebral infarction, or non-cardiogenic cerebral infarction such as atherothrombotic stroke or lacunar infarction, or cerebral infarction. Novel compounds are being actively developed for brain protection, based on the concept of HIF-1 activation (Takizawa S. et al., Rinsho Shinkei, Vol. 52, pp.911-912, 2012).

(8) Ischemic Heart Disease

The term "ischemic heart disease" refers to any disorder caused by inequality between proper myocardial oxygen demand and oxygen supply, with most ischemic heart disease being caused by coronary artery stenosis due to atherosclerosis or other vascular disorders. As molecular mechanisms, it is known that HIF-1 plays a role in attenuation of myocardial damage (Huan-Xin Zhao, et al., Basic Res. Cardiol., vol. 105, p.109-118, 2010), and also that HIF-1 plays a role in decreased vascular repair and vascularization with aging (Michel R. Hoening, et al., Current Molecular Medicine, vol. 8, p.754-767, 2008).

(9) Anti-Aging Drugs

The term "anti-aging drug" refers to a drug that inhibits signs of aging and extends healthy life. Proteasome control of the hypoxia response is known to regulate aging in nematodes (Ranjana Mehta, et al., Science, vol. 324, p.1196-1198, 2009). It has also been reported that HIF-1 and ROS are jointly involved in lifespan regulation by mitochondrial respiration (Ara B. Hwang and Seung-Jae Lee, Aging, vol. 3, p.304-310, 2011).

4. Other Compositions

The composition that includes oleuropein and oleuroside according to the invention can be suitably used in the form of a pharmaceutical composition and/or food composition (or food or beverage). The proportion of the composition of the invention added to a pharmaceutical composition or food composition is not particularly restricted so long as it exhibits its function, but it can usually be selected as appropriate in the range of 0.01 to 100 wt %. If the proportion of the composition of the invention is 100 wt %, this means that the pharmaceutical composition and/or food composition of the invention consists entirely of the composition of the invention.

The oleuropein and oleuroside in the pharmaceutical composition or food composition may each be present at 0.01 to 500 mg, preferably 0.05 to 300 mg, more preferably 0.1 to 150 mg, even more preferably 0.5 to 100 mg, yet more preferably 1 to 80 mg, even yet more preferably 2 to 50 mg, or 5 to 50 mg, for example, per single ingestion.

A pharmaceutical composition or food composition comprising the composition that includes oleuropein and oleuroside of the invention can be produced by adding the composition of the invention to the pharmaceutical composition or food composition. The weight ratio of both compounds may be adjusted using an appropriate method as described for production of the composition of the invention.

The form of the pharmaceutical composition or food composition of the invention is not particularly restricted, and it may be prepared in any of a variety of forms, including solid form such as powdered, granular or tablet form, solution form such as a liquid or emulsion form, as liquid composition-filled capsules, or in semi-solid form such as a paste. The dose of the pharmaceutical composition of the invention may be determined in consideration of the type of tablets, the method of administration, and the age, body weight and symptoms of the administered individual. A food or beverage of the invention may likewise be prepared in an appropriate consumption amount.

The composition of the invention may also be prepared as a formulation, by admixture with components such as a diluent, carrier or additives, and formulation processing. Diluents and carriers to be used are not particularly restricted so long as they do not interfere with the physiological activity of oleuropein and/or oleuroside, and examples include saccharides such as sucrose, glucose, fructose, maltose, trehalose, lactose, oligosaccharides, dextrin, dextran, cyclodextrin, starch, rice jelly and isomerized liquid sugar, alcohols such as ethanol, propylene glycol and glycerin, sugar alcohols such as sorbitol, mannitol, erythritol, lactitol, xylitol, maltitol, reduced palatinose and reduced starch hydrolysate, solvents such as triacetin, polysaccharides such as gum arabic, carrageenan, xanthan gum, guar gum, gellan gum and pectin, and water. Additives includes auxiliary agents such as chelating agents, and aromatics, spice extracts and antiseptic agents. From the viewpoint of convenience of use, when these diluents, carriers or additives are used to prepare a formulation, the composition of the invention is preferably adjusted to a content of 0.01 to 100 wt % and preferably 0.1 to 50 wt % in 100 wt % of the formulation.

A food composition comprising the composition including oleuropein and oleuroside according to the invention may be the composition of the invention itself as a supplement used as the active ingredient in a food or beverage, or the composition of the invention may be added as one component in a common food product to produce a functional food to impart the physiological activity of oleuropein and oleuroside to the food (that is, it may be included in a special-use health food, nutritional function food or functional food). Such food compositions include food compositions comprising or having oleuropein and oleuroside added in the weight ratios prescribed by the invention, with indication of the physiological action such as promoting HIF-1α activation, written on the container or in instructions. The food composition may also be a health food, nutritional supplement or enteral nutrition food, instead of a functional food.

Suitable foods and beverages are not restricted and include beverages such as fruit drinks, soft drinks, sports drinks, alcoholic beverages, tea and vitamin drinks, agricultural foods such as bread, noodles, rice, confectioneries (biscuits, cakes, candies, chocolate and Japanese confectioneries) and tofu and its processed products, fermented foods such as sake, medicinal liquor, mirin, vinegar, soy sauce and miso, fat foods such as dressing, mayonnaise, butter, margarine, shortening and edible fats and oils, livestock foods such as yogurt, ham, bacon and sausage, and seafoods such as kamaboko, fried tempura and hanpen.

5. Cosmetics

The composition which includes oleuropein and oleuroside according to the invention can also be suitably used in the form of a cosmetic. The proportion of the composition of the invention added to a cosmetic is not particularly restricted so long as it exhibits its function, but it can usually be selected as appropriate in the range of 0.01 to 100 wt %. If the proportion of the composition of the invention is 100 wt %, this means that the cosmetic of the invention consists entirely of the composition of the invention.

Cosmetics to comprise the composition which includes oleuropein and oleuroside according to the invention include base cosmetics such as cosmetic water, emulsions, creams, ointments, gels, lotions, oils, packs, mists and facial decorative sheets, and makeup cosmetics such as foundations and rouges. These cosmetics can be produced by known methods, with appropriate addition of known additives in ranges that do not interfere with the effect of the invention. Such additives include fats and oils, waxes, mineral oils, fatty acids, water-soluble polymer compounds such as alcohols and polyhydric alcohols, esters, metal soaps, gums and saccharides, surfactants, vitamins, amino acids, plant- or animal-derived additives, marine algae, animal-derived materials, marine ingredients, microbial culture metabolites, inorganic pigments, ultraviolet absorbing/blocking agents, skin whiteners, tyrosinase activity inhibitors, melanin pigment reducers/decomposers, cell activators, astringents, active oxygen scavengers, antioxidants, lipid peroxide production inhibitors, anti-inflammatory drugs, antimicrobial, bactericidal and disinfecting agents, humectants, aromatics and pigments, as well as hormones, metal ion chelators, pH adjustors, chelating agents, aseptic/antifungal agents, refrigerants, stabilizers, emulsifiers, animal/vegetable proteins and their decomposition products, animal/vegetable polysaccharides and their decomposition products, animal/vegetable glycoproteins and their decomposition products, blood flow accelerators, anti-inflammatory drugs, antiphlogistic and antiallergic drugs, wound healing agents, foam boosters, thickeners, enzymes and purified water (such as Millipore™ water, ion-exchanged water, ion-exchange distilled water and electron water).

EXAMPLES

The following examples serve as illustration of different modes of the present disclosure. It will be apparent to a person skilled in the art that various modifications may be made to both the materials and methods while still being within the scope of the present disclosure. All of the reagents and solvents purchased from commercial product suppliers were used without further purification or processing.

Example 1: Preparation of HIF-1α Activator

Fresh olive leaves were harvested from fields in the Siliana Governorate of midwestern Tunisia in mid-December, 2018, and dried indoors at 20 to 25° C. The dried leaves were converted to powder using a food processor (MK-K48, Panasonic, Japan). A 25 g portion of the powder was immersed in 500 ml of sterilized distilled water and extracted for 30 minutes in a water bath (WBS-80A, Asone, Japan) at 90° C. After extraction, the decoction that had been cooled at room temperature was filtered with stericup and steritop vacuum driven sterile filters (0.22 μm pore size, SCGPT05RE, Merck, Germany). The resulting filtrate was evaporated to half volume using a centrifugal concentration system comprising a vacuum pump (DIVAC 1.2 L, Leybold, Germany), a cooling water circulator (CCA-1110, EYELA, Japan) and a rotary evaporator (N-1000, EYELA), to obtain a liquid extract. In order to prevent repeated freezing and thawing, it was dispensed into 0.6 ml tubes, shielded with aluminum foil and stored at −80° C. in a deep freezer (CLN-50U, Nihon Freezer Co., Ltd., Japan) until use.

To obtain the components of the olive leaf extract for use, the extraction powder obtained from the olive leaf extract was dissolved in MeOH to a concentration of 50 mg/1 mL and then filtered with a 0.22 μm filter. An HPLC (Shimadzu, Japan) was then used under the following conditions for component analysis of the olive leaf extract.

<Analysis Conditions>
Column: TSKgel ODS-100 V (3 μm, 2.0 mm×15 cm)
Flow rate: 0.2 mL/min
UV detection: 254 nm or 331 nm
Sample volume: 10 μL
Eluate: 0.5% $CH_3COOH/ACN$
Gradient: 0 min, 5%→5 min, 15%→25 min, 30%→35 min, 35%
Column temperature: 40° C.
MS: ESI The analysis indicated that the olive leaf extract used contained at least oleuropein and oleuroside (FIG. 1).

Example 2: Action Mechanism of HIF-1α Activator

HIF-1α→EPO→EPOR→CASP3→GATA-1→GYPA→erythrocyte/hemoglobulin increase

<Cell Culture and Sample Treatment>

Human bone marrow CD34+ progenitor cells (Lonza Inc., Switzerland) were purchased, and the cells were supported on a 60 mm dish in 5% $CO_2$ for 7 days (day 0 to day 7) at 37° C., 95% humidification, using StemPro™-34 complete medium (Gibco, USA). On day 8, the cells were seeded on a 24-well plate to a concentration of $2\times10^4$ cell/ml in the medium. From day 9 until day 21 (D0-D12), the cells were treated with olive leaf extract 0 at a concentration of 40 μg/mL. The medium was replaced every 3 days.

<Immunofluorescence Analysis>

For immunofluorescent staining of the proteins of the treated cells, $2.0\times10^7$ hematopoietic stem cells were plated on the well bottoms of a 24-well plate and then air-dried to cause surface adhesion. The cells were then fixed for 10 minutes with 4% paraformaldehyde at room temperature. For Hb subunit detection, the cells were passed through 0.1% Triton X-100 (Merck KGAA, Germany) for 10 minutes at room temperature, and rinsed 3 times with PBS. The cells were blocked for 1 hour at room temperature using 5% goat serum. All primary antibodies: anti-GYPA antibody (ab129024), anti-TFRC antibody (ab1086), anti-CD47 antibody (ab175388), anti-HBA antibody (ab92492), anti-HBB antibody (ab214049) and anti-HBG antibody, were purchased from Abcam (UK). The blocked cells were incubated overnight at 4° C. together with each primary antibody diluted to 1:1000 with 1% goat serum, and were then rinsed 3 times with PBS. The Alexa secondary antibodies: goat anti-rabbit IgG Alexa Fluor 488 (A32731) and goat anti-mouse IgG Alexa Fluor 594 (ab150116) were purchased from Thermo Fisher Scientific (USA) and Abcam, respectively. The cells were then incubated for 1 hour together with each secondary antibody diluted to 1:1000 with 1% goat serum, and rinsed 3 times with PBS. The nuclei were stained for 10 minutes with 1 μg/mL Hoechst 33342 (H21492, Thermo Fisher Scientific) and rinsed 3 times with PBS. The stained cells were visualized with an Olympus Corp. IX83 inverted microscope (Olympus Life Science, Japan) using cellSens imaging software (Olympus Life Science).

<RNA Extraction>

Using the RNA extraction reagent Isogen 311-02501, Nippon Gene, Japan), total RNA was extracted from K562 cells treated for 6 days and hHSCs at day 9 (D0 before treatment) and day 21 (D12 after treatment), according to the manufacturer's protocol. The concentration of the total RNA was quantified using a NanoDrop 2000 spectrophotometer (Thermo Scientific, USA).

Figure 2:
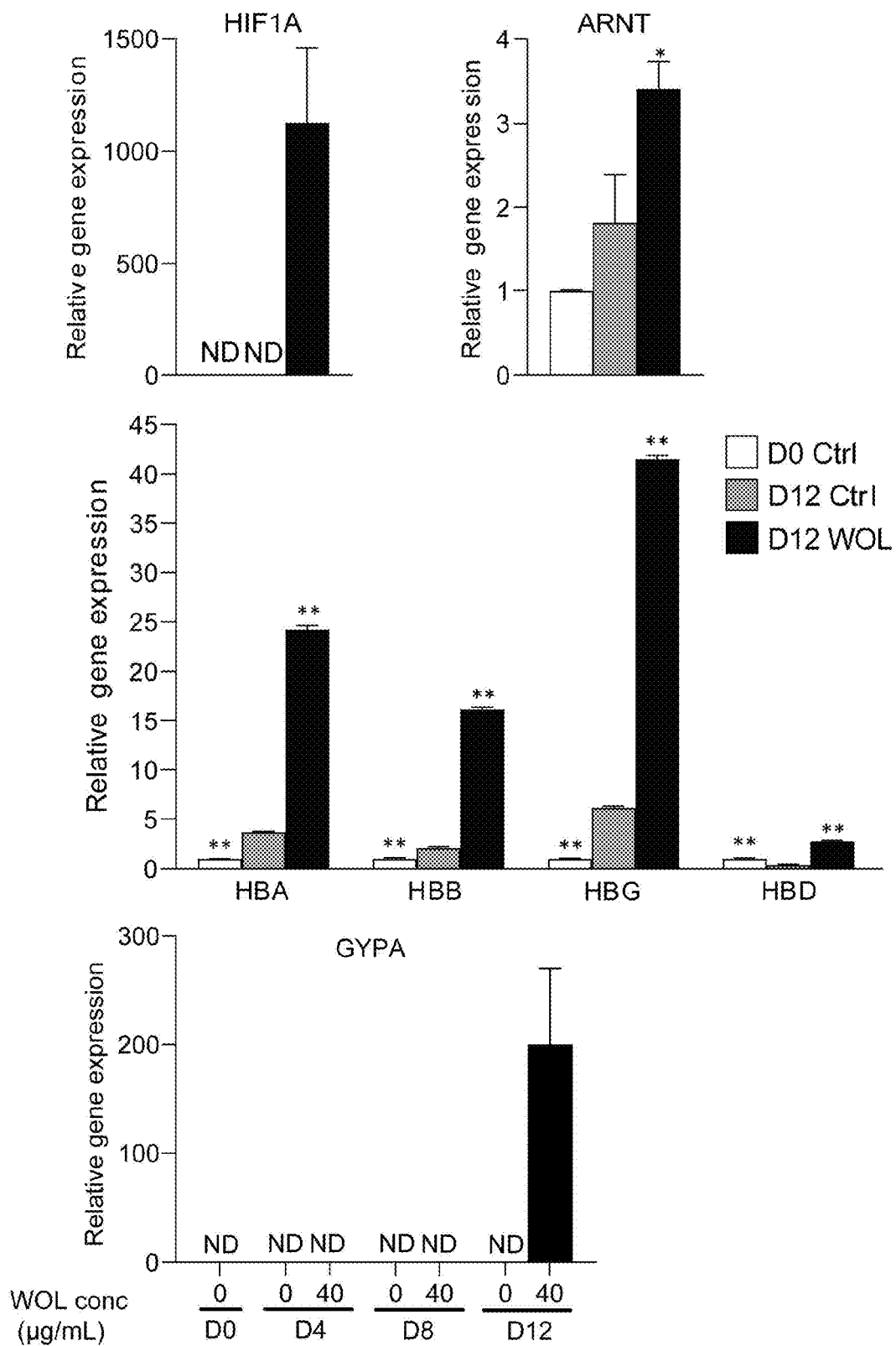
FIG. 2 shows the results of examining gene expression in olive leaf extract.

The results are shown in FIG. 2. Gene expression of HIF-1α and ARNT (HIF-1β) was significantly increased with the olive leaf extract compared to the control. GYPA gene expression was increased, and differentiation to erythrocytes was significantly increased compared to the control. Hemoglobin α chain, β chain, γ chain and δ chain gene expression were also significantly increased compared to the control.

<Animal Preliminary Test>

The ICR mice used for the experiment (10 mice, male, 4-week-old) were purchased from Charles River Japan). The mice were placed in separate cages and conditioned for 1 week in a laboratory environment with a breeding room kept under conditions of temperature (21 to 23° C.) and light (light:dark=12:12 hr), allowing free access to food and water. After conditioning, the mice were divided into a Normal Saline (NS)-administered control group (n=4) and an olive leaf water extract (WOL)-administered group (n=6). For the WOL-administered group, WOL prepared to a dose for 150 mg/kg body weight using physiological saline, was orally administered every day for 25 days using a sonde. On the final day of administration, whole blood was harvested from the inferior vena cava of the mice under isoflurane anesthesia. The harvested whole blood was subjected to anti-clotting treatment with heparin. Blood plasma was also harvested by centrifugation of whole blood (3,000 rpm, 15 minutes) for plasma iron concentration analysis. Hematology examination for red blood cell count (RBC), hemoglobin (HGB), hematocrit (HCT), reticulocytes and plasma iron concentration (Plasma Fe) was entrusted to BioSafety Research Center Inc. (Japan). RBC, HGB, HCT and reticulocytes were measured using an ADVIA 120 general hematology examination system (Siemens Healthineers, Germany). Plasma iron concentration measurement was carried out using the Nitroso-PSAP method.

Figure 3:
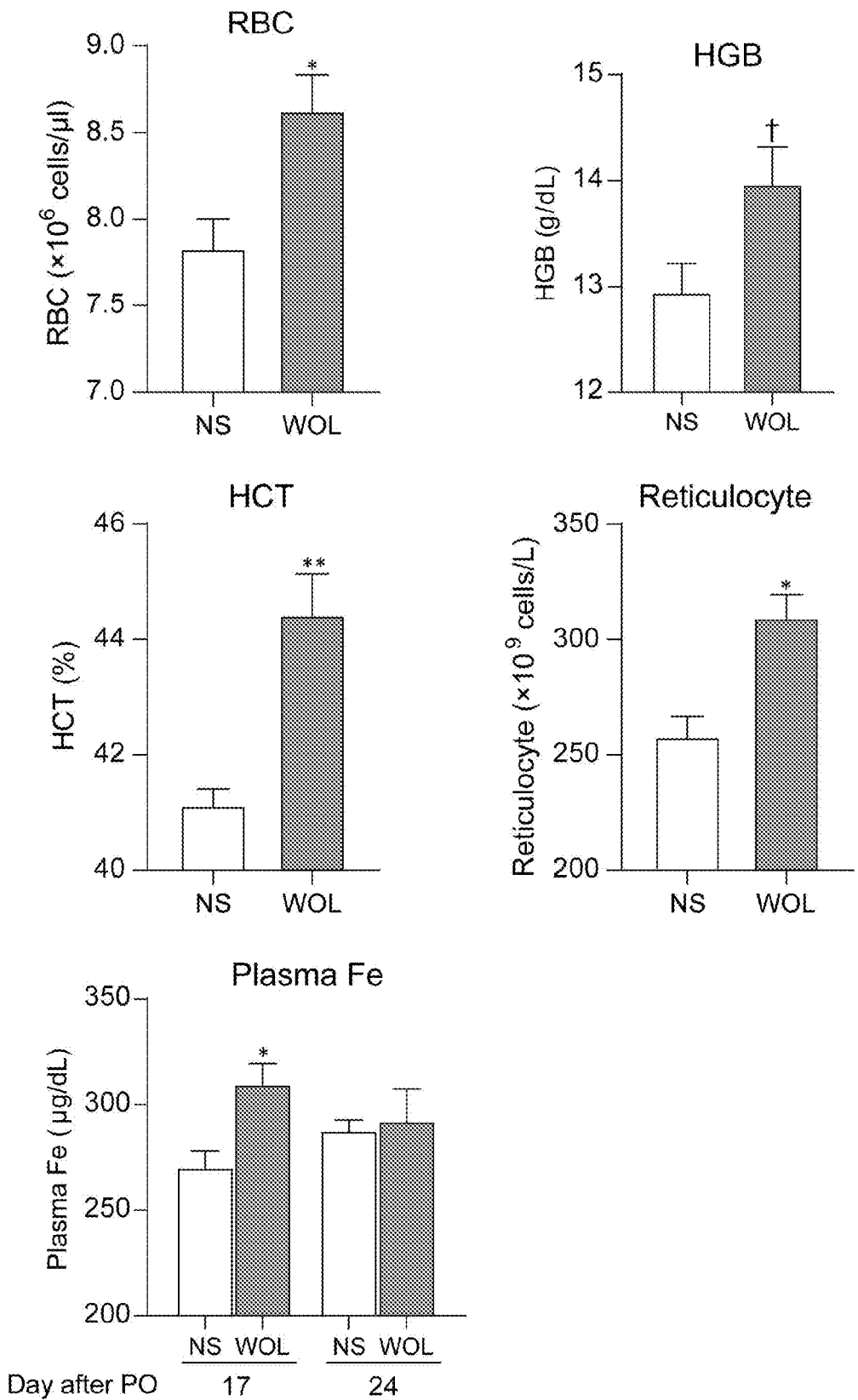
FIG. 3 is set of graphs comparing changes in increase in red blood cell count with and without administration of olive leaf extract to mice.

The results are shown in FIG. 3. Compared to the control group, the olive leaf extract-administered group had significantly increased erythrocytes, hemoglobin, hematocrit and reticulocytes. Plasma iron was significantly increased by 17 days. After 24 days, it had decreased to about the same level as the control group, suggesting that iron had been incorporated into the erythrocytes.

<Hemolytic Anemia Animal Test>

The ICR mice used for the experiment (67 mice, male, 4-week-old) were purchased from Charles River Japan). The mice were placed in separate cages and conditioned for 1 week in a laboratory environment with a breeding room kept under conditions of temperature (21 to 23° C.) and light (light:dark=12:12 hr), allowing free access to food and water. After conditioning, the mice were divided into a Normal Saline (NS)-administered group (n=20), a hemolytic anemia inducer phenylhydrazine (PHZ)-administered group (n=20) and a WOL+PHZ-administered group (n=27). For the WOL+PHZ-administered group, WOL prepared to a dose for 150 mg/kg body weight using physiological saline, was orally administered every day for 25 days using a sonde. Physiological saline was similarly administered orally to the NS-administered group and PHZ-administered group during this period. On the 18th day after starting oral administration, PHZ was intraperitoneally administered once at 60 mg/kg body weight to the PHZ-administered group and the WOL+PHZ-administered group. Similarly, physiological saline was intraperitoneally administered once to the NS-administered group. At 1, 3, 5 and 7 days after PHZ administration, whole blood was harvested from the inferior vena cava of the mice under isoflurane anesthesia. The harvested whole blood was subjected to anti-clotting treatment with heparin. Hematology examination for red blood cell count (RBC) and reticulocytes was entrusted to Bio-Safety Research Center Inc. (Japan). RBC and reticulocytes were measured using an ADVIA 120 general hematology examination system (Siemens Healthineers).

Figure 4:
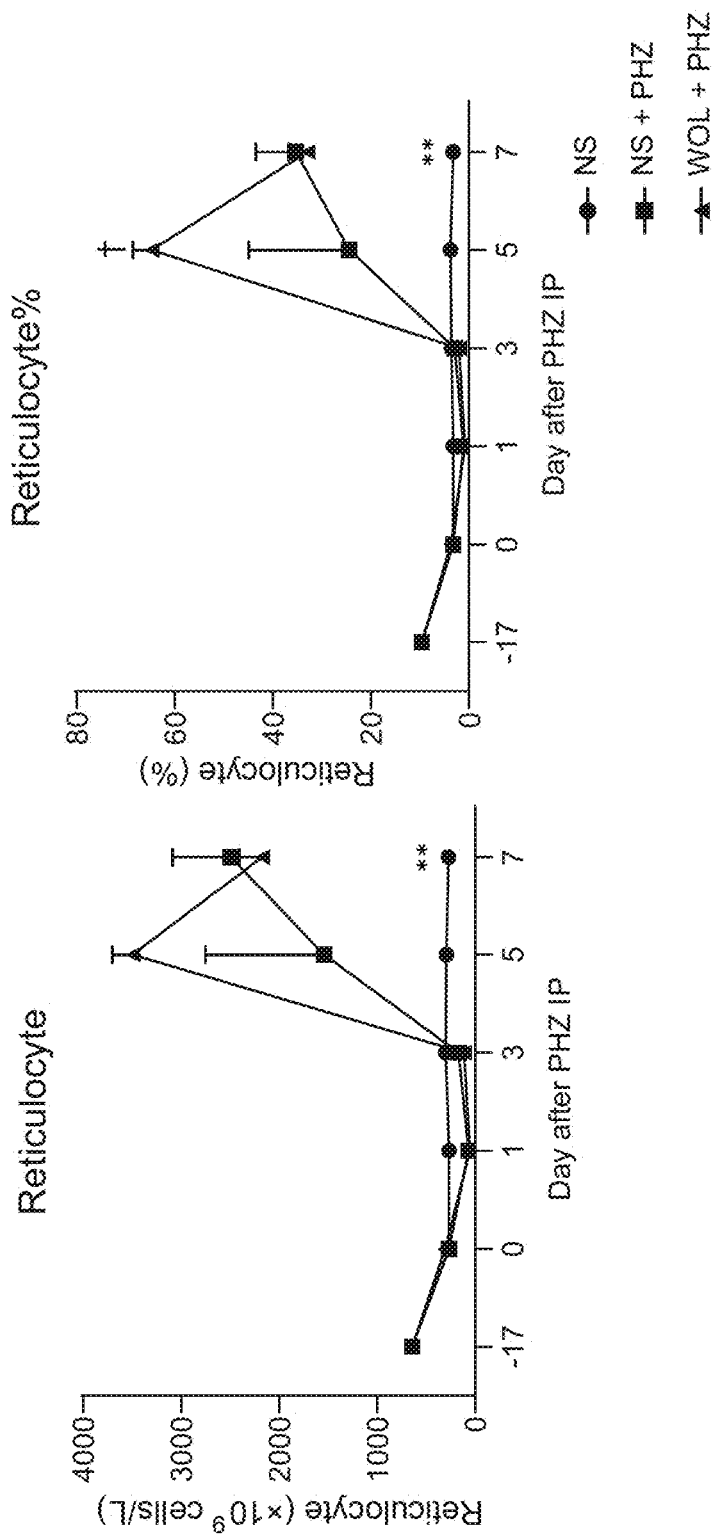
FIG. 4 is a pair of graphs showing improvement in anemia by administration of olive leaf extract to anemic mice.

The results are shown in FIG. 4. The reticulocyte rate increased significantly after causing anemia by PHZ administration, suggesting an effect of promoting amelioration of hemolytic anemia.

<Preparation of Hematopoietic Stem Cells and Synthesis of Ribosomes>

1. Preparation of Test Substance

The olive leaf extract powder prepared in Example 1 was prepared as a 20 mg/mL solution using Hematopoietic Stem Cell Basal Medium (Cat. No. 620-50, Toyobo, Japan), and the solution was filtered with a sterile filter for use as a stock solution.

2. Cell Preparation

Frozen human hematopoietic stem cells (Cat. No. 490BM05A, Lot No. 3335, Toyobo) ($5 \times 10^5$ cell/mL) were thawed (≤90 sec) in a hot water bath (37° C.), and the thawed solution was added to 10 mL of Hematopoietic Stem Cell Basal Medium and centrifuged at 400×g for 10 minutes. Hematopoietic Stem Cell Basal Medium was again added to the precipitate (cells) for adjustment to $2.5 \times 10^5$ cell/mL for use as a cell solution.

3. Cell Culture (Main Test)

The human hematopoietic stem cell solution was seeded in a 48-well plate at $7.8 \times 10^4$ cells/200 μL/well and cultured for 1 day in a $CO_2$ incubator (5% $CO_2$, 37° C.). Proliferation medium containing the test substance (2-fold concentration) was then added at 200 μL/well, and culturing was carried out for 0 days, 4 days, 8 days and 12 days. From the different processed day groups, 60 μL (3900 cells) was recovered for ribosomal protein analysis, 40 μL (2600 cells) was recovered for gene expression analysis, and 20 μL (1300 cells) was recovered for viable cell count measurement. The measurements after cell recovery were carried out in the following manner.

4. Viable Cell Count Measurement

A 20 μL portion of the cultured cell solution was added into wells of a 96-well plate. After adding 30 μL of Hematopoietic Stem Cell Basal Medium to each well, 50 μL of viable cell measurement reagent SF was further added. The absorbance of each culture supernatant (measuring wavelength: 450 nm, reference wavelength: 595 nm) was measured immediately and 60 minutes after addition. The amount of change in absorbance per hour was calculated from the values immediately and 60 minutes after addition, as the relative viable cell count.

5. Gene Expression Analysis

Total RNA collection from the cells and conversion to cDNA were carried out according to the protocol of a FastLane Cell RT-PCR kit (Cat. No. 215011, Qiagen, Germany).

(1) The cells recovered in 3. above were centrifuged for 10 minutes at 400×g, 80 μL of Buffer FCW was added to the precipitate (cells), and centrifugation was repeated for 10 minutes at 400×g.

(2) After adding 30 μL of Buffer FCP to the precipitate (cells) and incubating for 5 minutes at room temperature (25° C.), the tube was stored at −80° C. until subsequent cDNA conversion.

(3) The lysate was dissolved at room temperature. After then adding 2 μL of gDNA Wipeout Buffer, 1 μL of FastLane lysate and 11 μL of RNase-free water to a fresh PCR tube, reaction was conducted at 42° C. for 5 minutes. It was then immediately transferred onto ice.

(4) 6 μL of reverse transcription master mix (1 μL of Quantiscript Reverse Transcriptase, 4 μL of Quantiscript RT Buffer, 1 μL of RT Primer Mix/tube) was added to 14 μL of the reaction mixture obtained in (3), and the mixture was incubated at 42° C. for 30 minutes.

(5) The reaction mixture was treated at 95° C. for 3 minutes for inactivation of the reverse transcriptase. The reaction mixture was used as synthetic cDNA for real-time PCR (Realtime PCR Eco, Illumina, USA). It was stored at −80° C. until use for analysis.

<Real-Time PCR>

A reaction mixture was prepared in a Real-time PCR specialized tube in the following manner and used for PCR reaction.

[Table 2]

TABLE 2

| | |
|---|---|
| $dsH_2O$ | 2.4 μL |
| SYBER Premix Ex Taq | 4.0 μL |
| Forward primer (20 μM) | 0.3 μL |
| Reverse primer (20 μM) | 0.3 μL |
| Synthetic DNA | 1.0 μL |
| Total volume | 8.0 μL |

The specific primers (FASMAC, Japan) for each gene used in the test and the PCR reaction conditions were as shown below.

[Table 3]

TABLE 3

| Gene | Direction | Sequence (5'→3') |
|---|---|---|
| GAPDH | Forward | CATCCCTGCCTCTACTGGCGCTGCC (SEQ ID NO: 1) |
|  | Reverse | CCAGGATGCCCTTGAGGGGGCCCTC (SEQ ID NO: 2) |
| β-Actin | Forward | GAGCACAGAGCCTCGCCTTT (SEQ ID NO: 3) |
|  | Reverse | TCATCATCCATGGTGAGCTGGC (SEQ ID NO: 4) |
| 18S rRNA | Forward | CTTAGAGGGACAAGTGGCG (SEQ ID NO: 5) |
|  | Reverse | GGACATCTAAGGGCATCACA (SEQ ID NO: 6) |
| 28S rRNA | Forward | ACGGCGGGAGTAACTATGAC (SEQ ID NO: 7) |
|  | Reverse | CTTGGCTGTGGTTTCGC (SEQ ID NO: 8) |
| Glycophorin A | Forward | ATATGCAGCCACTCCTAGAGCTC (SEQ ID NO: 9) |
|  | Reverse | CTGGTTCAGAGAAATGATGGGCA (SEQ ID NO: 10) |

The reaction conditions (PCR temperature conditions, cycle count) were as follows:
(a) Polymerase activation: 30 sec at 95° C.;
(b) PCR cycling: 60 cycles of 10 sec at 95° C., 30 sec at 60° C.
(c) Melting curve: 15 sec at 95° C., 15 sec at 55° C., 15 sec at 95° C.

Calculation of Relative Quantities

The Ct value (PCR cycle count) was calculated as the intersection between the amplification curve and threshold line for each gene. It is obtained by subtracting the Ct value of the internal standard GAPDH gene from the Ct value of the target gene (Ct (target gene)−Ct (internal standard)=ΔCt value). In addition, the mean ΔCt value of a blank is subtracted from the ΔCt value, as ΔCt (sample treatment group)−ΔCt (blank group)=ΔΔCt value. The value of $2^{-\Delta\Delta Ct}$, with the value of ΔΔCt replacing the multiplier term, is the relative expression level.

<Measurement of 40S Ribosomal Protein S10 Level by ELISA>

The 40S ribosomal protein in the cells was measured using a human 40S ribosomal protein S10 ELISA kit (Cat. No. MBS7246235, MyBioSource.com, USA). The method used was according to the kit instructions. The details are described below.

(1) The cells recovered in 3. above were centrifuged for 10 minutes at 400×g, 200 μL of PBS was added to the precipitate (cells), and after rinsing, centrifugation was repeated for 10 minutes at 400×g.
(2) A 150 μL portion of PBS was added to the precipitate (cells) and freezing/thawing was repeated 3 times (cell disruption treatment). The disruptate was centrifuged at 1000×g for 15 minutes, and the supernatant was used as a specimen for measurement of the ribosomal protein.
(3) 100 μL of standard (0, 1.0, 2.5, 5.0, 10, 25 ng/mL ribosomal protein) and specimen (stock solution) were added to the kit microplate accessory.
(4) 10 μL of Balance Solution was added to the specimen-added wells.
(5) 50 μL of conjugate was added to each well and reaction was conducted at 37° C. for 1 hour.
(6) Each well was rinsed with 200 μL of 1×wash. This procedure was repeated 5 times.
(7) 50 μL of substrate A and 50 μL of substrate B were added to each well, and the mixture was treated for 20 minutes at 37° C.
(8) 50 μL of stop solution was added to each well, the absorbance (450 nm) of the wells was measured using a plate reader, and the ribosomal protein level was calculated from a standard curve.

<Measurement of Protein Concentration>

(1) For measurement of protein concentration, the BSA standard solution (80 μg/ml) in a TaKaRa BCA Protein Assay Kit (Cat. No. T9300A, Takara, Japan) was used to prepare 80, 40, 20, 10, 5, 2.5 and 1.25 μg/ml BSA standard solutions using sterilized water.
(2) The BSA standard solutions and measuring samples (5-fold dilution with PBS) were added to the wells at 100 μl each.
(3) 100 μl of reaction mixture was added to each well and stirred for 1 minute using a plate mixer.
(4) The mixture was incubated for 2 hours at 37° C. (coloring reaction).
(5) The absorbance of each well was measured using a plate reader (measuring wavelength: 562 nm).
(6) The protein concentration (mg/mL) of the measuring sample was calculated from a standard curve.

<Calculation of 40S Ribosomal Protein S10 Level>

The ribosomal protein levels with respect to protein levels (ng/μg protein) were calculated from the ribosomal protein levels and protein levels obtained as described above.

Figure 5:
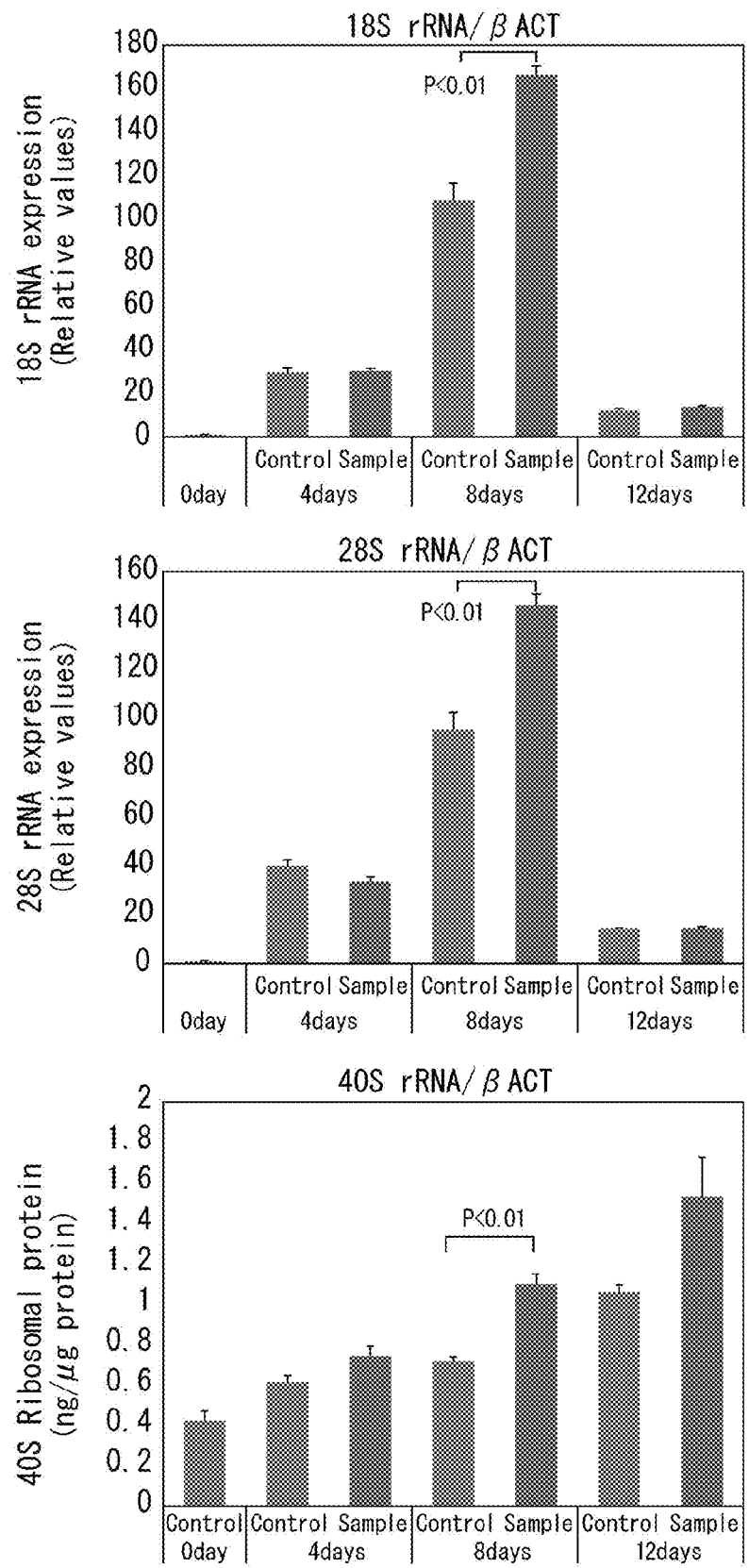
FIG. 5 shows results of examining rRNA gene expression.

Ribosomal RNA (rRNA) gene expression and ribosome biosynthesis were significantly increased. This suggested an effect of promoting ribosome biosynthesis, which is one factor involved in differentiation to erythrocytes (see FIG. 5).

<Examining Antianemic Action of Olive Leaf Hot Water Extract>

After harvesting whole blood from the mice used in the hemolytic anemia animal test, each of the organ tissues (liver, spleen and small intestine) were harvested. After rinsing the tissue with PBS, Isogen (Nippon Gene Co., Ltd., Japan) was added for homogenization, and the total RNA was extracted according to the manufacturer's instructions. The RNA concentration was measured using a NanoDrop 2000 spectrometer (Thermo Scientific, USA). For cDNA synthesis, 4 μl of SuperScript IV VILO Master Mix (Invitrogen, USA) and 16 μl of total RNA solution (final RNA concentration: 10 ng/20 μl) were mixed in a PCR tube, and a MiniAmp Plus thermal cycler (Applied Biosystems, USA) was used for reverse transcription. The thermal cycle was 10 minutes at 25° C., 10 minutes at 50° C., 5 minutes at 85° C. and 1 minute at 4° C. Quantitative real-time PCR was carried out for gene expression analysis. The Taqman primer and probe set used for the target gene expression analysis were the following: Hamp (Mm04231240_s1), Fpn (Mm00489837_m1). Actb (Mm02619580_g1) was used as the endogenous standard. After mixing 10 μL of TaqMan Gene Expression Master Mix (Applied Biosystems), 1 μL of each primer and probe set and 9 µL of cDNA (final cDNA concentration: 200 ng/20 µL) in a 96-well PCR plate, an AB7500 Fast Real-Time PCR system (Applied Biosystems) was used for Taqman real-time PCR amplification reaction and gene expression level assay. The thermal cycle was 2 minutes at 50° C., 10 minutes at 95° C., 15 seconds at 95° C. (50 cycles) and 1 minute at 60° C. The gene expression levels were calculated by the ΔΔCt method.

Figure 6:
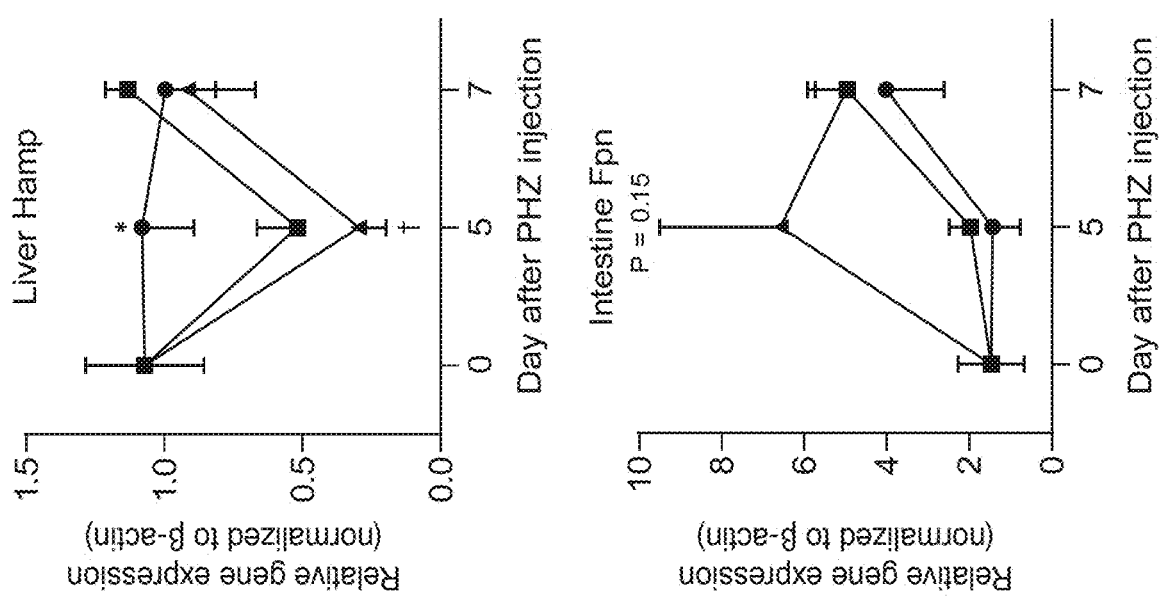
FIG. 6 shows results of examining antianemic action by a hot water extract of olive leaf.

The results are shown in FIG. 6. Liver Hamp expression levels were significantly reduced in the PHZ group on the 5th day after PHZ administration. With WOL administration, however, the reduction in expression levels was further accelerated. On the 5th day after PHZ administration, small intestine and spleen Fpn expression levels were increased in the WOL group compared to the PHZ group. However, no change was seen in liver/bone marrow Fpn expression levels (data not shown). This suggested that during recovery from anemia, WOL has an effect of promoting intestinal absorption of dietary Fe and an effect of promoting Fe release from spleen macrophages.

Example 3: Synergistic Effect of OP/OS Using GYPA as Marker

<Cell Culture and Sample Treatment>

K562 cells (Riken Cell Bank) were seeded in a 6-well plate using RPMI 1640 Medium (Gibco Waltham, MA, USA) containing 10% FBS and 1% penicillin/streptomycin solution added to a cell concentration of $2 \times 10^4$ cell/ml, and the cells were cultured in 5% $CO_2$ at 37° C., 95% humidification. On the following day, the medium was replaced with a mixed solution of oleuropein (OP) and oleuroside (OS), and reaction was conducted for 6 days. The mixing proportions were as follows: (a) combinations of 35.36 µM OP and different concentrations of OS (1.18, 3.54, 5.23, 7.10, 17.68, 23.57, 35.36 and 43.85 µM), and (b) combinations of 5.23 µM OS and different concentrations of OP (0.52, 2.62, 5.23, 10.46, 20.92, 35.36, 41.84 and 52.30 µM). The medium was replaced every 3 days.

<Gene Expression Analysis Using Quantitative Real-Time PCR>

After 6 days of reaction, the medium was removed from the cells, Isogen (Nippon Gene Co., Ltd.) was added for sonication, and the total RNA was extracted according to the manufacturer's protocol. The RNA concentration was measured using a NanoDrop 2000 spectrometer (Thermo Scientific, USA). For cDNA synthesis, 4 µl of SuperScript IV VILO Master Mix (Invitrogen) and 16 µl of total RNA solution (final RNA concentration: 10 ng/20 µl) were mixed in a PCR tube, and a MiniAmp Plus thermal cycler (Applied Biosystems) was used for reverse transcription. The thermal cycle was 10 minutes at 25° C., 10 minutes at 50° C., 5 minutes at 85° C. and 1 minute at 4° C. Quantitative real-time PCR was carried out for gene expression analysis. The Taqman primer and probe set used for the target gene expression analysis was the following: GYPA (Hs011068079_s1). ACTB (Hs03023880 g1 was used as the endogenous standard. For Taqman real-time PCR amplification reaction and gene expression level quantitation, 10 µL of TaqMan Gene Expression Master Mix (Applied Biosystems), 1 µL of each primer and probe set and 9 µL of cDNA (final cDNA concentration: 100 ng/20 µL) were mixed, and an AB 7500 Fast Real-Time PCR system (Applied Biosystems) was used. The thermal cycle was 2 minutes at 50° C., 10 minutes at 95° C., 15 seconds at 95° C. (50 cycles) and 1 minute at 60° C. The gene expression levels were calculated by the ΔΔCt method.

Figure 7:
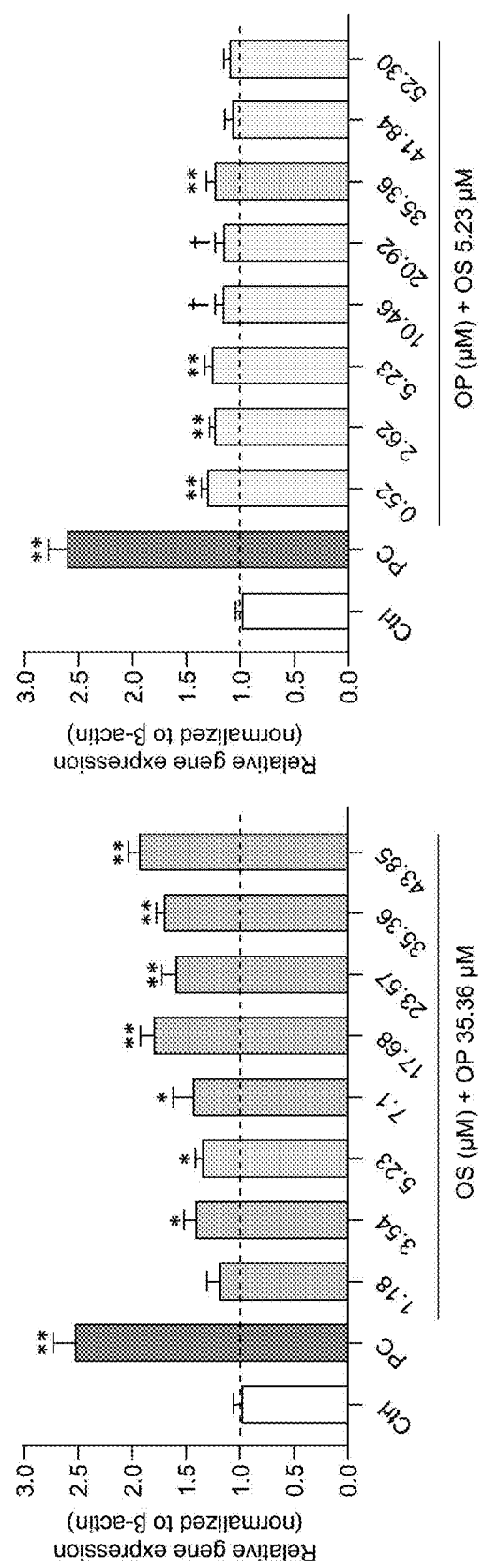
FIG. 7 shows results of examining GYPA gene expression effects of oleuroside (OS) and oleuropein (OP) in different ratios.

The results are shown in FIG. 7. GYPA gene expression significantly increased when oleuroside:oleuropein were included in a proportion in the range of 1:10 to 10:1, suggesting that an effect of promoting differentiation to erythrocytes is exhibited when oleuropein and oleuroside are in specific proportions.

Figure 8:
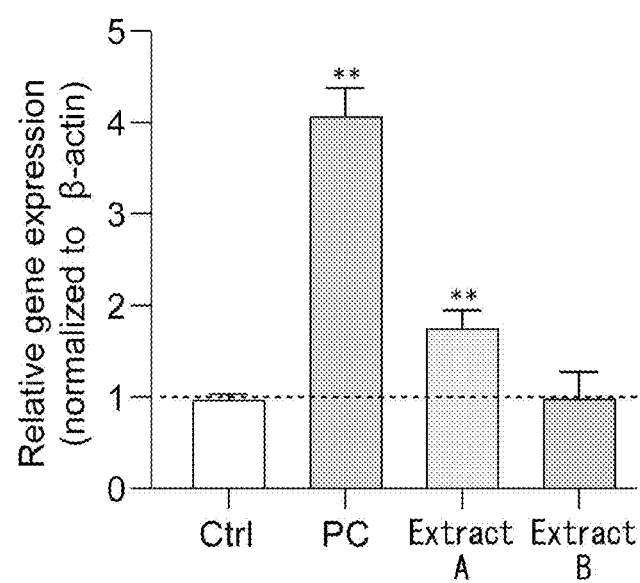
FIG. 8 shows results of examining differences in effects on GYPA gene expression with different olive leaf extracts. Ctrl: Control; PC: Positive Control (50 µM apigenin); extract A: invention olive leaf extract; extract B: control olive leaf extract.

Two types of olive leaf extract with different content ratios of oleuropein and oleuroside were used to treat K562 cells, and the GYPA gene expression levels were measured by real-time PCR, as an erythroid differentiation marker. The test substances used were olive leaf extract A: 120 µg/mL (1.89 µg oleuroside: 15.44 µg oleuropein) ("extract A", corresponding to the invention), and olive leaf extract B: 120 µg/mL (1.56 µg oleuroside: 40.26 µg oleuropein) ("extract B"). As a result, GYPA expression significantly increased only with extract A (see FIG. 8). It was therefore suggested that activity differs depending on the oleuroside:oleuropein proportion.

Example 4: Hematopoietic Action of HIF-1α Activator

<Human Pretest Method>

Figure 9:
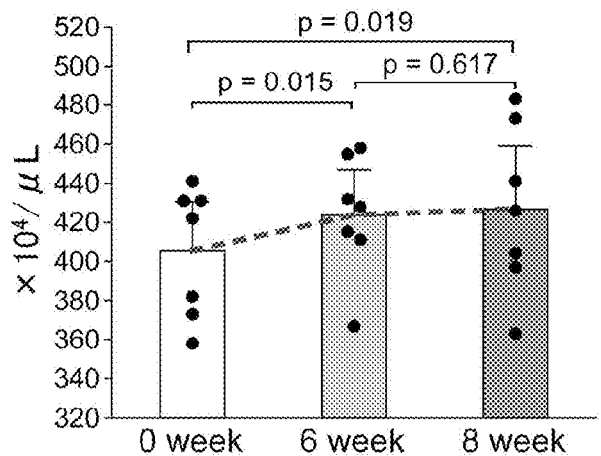
FIG. 9 shows results of examining time-dependent changes in red blood cells (RBC) and hemoglobin concentration after ingestion of olive leaf extract by participants.
Figure 9:
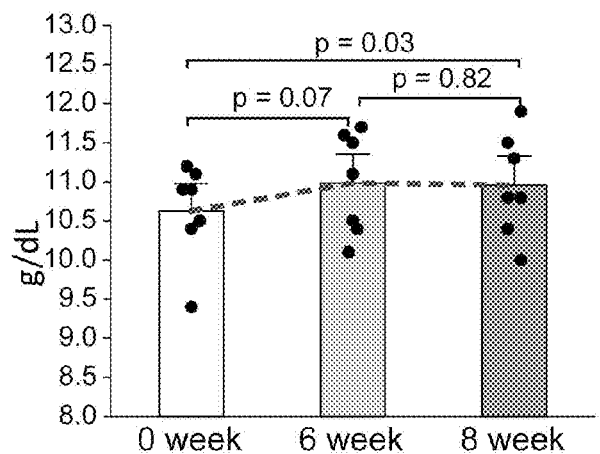

Olive leaf extract was ingested by healthy female participants of age ≥20 and <50, for 8 weeks at a dose of 500 mg per day. Blood was collected before, 6 weeks after and 8 weeks after starting ingestion, and the erythrocytes and hemoglobin concentrations were measured. The results are shown in FIG. 9. The erythrocyte and hemoglobin concentrations significantly increased at 6 weeks and 8 weeks after ingestion compared to before ingestion, suggesting a differentiation-inducing effect from hematopoietic stem cells to erythrocytes in humans as well.

The hydroxytyrosol, oleuropein, oleuroside, apigenin, apigenin-7-glucoside, apigenin-7-O-rutinoside, luteolin and luteolin-7-O-glucoside present in olive leaves were used either alone or in combination to measure the GYPA gene expression effect by the same method as for the synergistic effect with OP/OS at 10:1 to 1:10 using GYPA as the marker. The results are shown in Table 4-1 below. GYPA gene expression increased only with the combination of oleuroside and oleuropein. No effect was seen with oleuroside alone or oleuropein alone.

TABLE 4-1

Table 4

| | Combination | GYPA expression increase |
|---|---|---|
| | 8-type mixture | Yes |
| | 6-type mixture (w/o OS, A7R) | No |
| | 7-type mixture (w/o OS) | No |
| 3-type mixture treatment | HT + OP + OS | Yes |
| | A + A7G + A7R | No |
| 2-type mixture treatment | A + A7G | No |
| | L + L7G | No |
| | OP + HT | No |
| | OP + A | No |
| | OP + A7G | No |
| | OP + L | No |
| | OP + L7G | No |
| | OS + HT | No |
| | OS + OP | Yes |
| | OS + A | No |
| | OS + A7G | No |
| | OS + A7R | No |
| | OS + L | No |
| | OS + L7G | No |

TABLE 4-1-continued

Table 4

| | Combination | GYPA expression increase |
|---|---|---|
| Treatment alone | HT | No |
| | OP | No |
| | OS | No |
| | A | No |
| | A7G | No |
| | A7R | No |
| | L | No |
| | L7G | No |

TABLE 4-2

| Compound in WOL | Abbreviation |
|---|---|
| Hydroxytyrosol | HT |
| Oleuropein | OP |
| Oleuroside | OS |
| Apigenin | A |
| Apigenin-7-O-glucoside | A7G |
| Apigenin-7-O-rutinoside | A7R |
| Luteolin | L |
| Luteolin-7-O-glucoside | L7G |

<Capillary formation promotion test using HUVEC cells>
Test Methods
(1) Test Substances
The test substances used were olive leaf extract, oleuroside, oleuropein and $CoCl_2$ (positive control substance).
(2) Cells
Human umbilical vein endothelial cells (HUVEC) (pre-screened) (Cat. No. C2519AS, Lot No. 0000635747, LONZA) were used for the experiment.
(3) Reagents and Devices
EGM™-2, BulletKit™ (Cat. No. CC-3162, LONZA)
DMSO (Cat. No. 13445-74, Nacalai Tesque, Japan)
Oleuropein (Cat. No. 00420, Lot No. 5GACK-WA, TCI, Japan)
Oleuroside (Cat. No. orb594438, Biorbyt, UK)
Cobalt (II) chloride hexahydrate (Cat. No. 036-03682, Wako, Japan)
2.5 g/l-trypsin/1 mmol/1-EDTA solution (Cat. No. 32777-44, Nacalai Tesque)
PBS (Code 05913, Nissui Pharmaceutical Co., Ltd., Japan)
Vascularization assay kit (Tube Formation) (PromoKine, Cat. No. PK-CA577-K905, PromoCell, Germany)
75 $cm^2$ cell culture flask (Cat. No. 3276, Corning, USA)
Adherent cell culture plate 96F (Cat.MS-8096F, SUM-ILON, Japan).
1.5 mL Ring lock micro tube (Cat. No. BM-15, BM Equipment Co., Ltd., Japan)
Inverted phase contrast microscope (CKX53, Olympus Corp., Japan)
Methods
(1) Culturing of HUVEC Cells
HUVEC cells were precultured using special medium in a $CO_2$ incubator (5% $CO_2$, 37° C.) inside a T75 flask, to the necessary cell count. For subculturing of the cells, trypsin/EDTA solution was used to separate the cells from the flask and the trypsin was neutralized with test medium, after which the cells were recovered by centrifugation and resuspended in test medium for use as a cell suspension.

Figure 10:
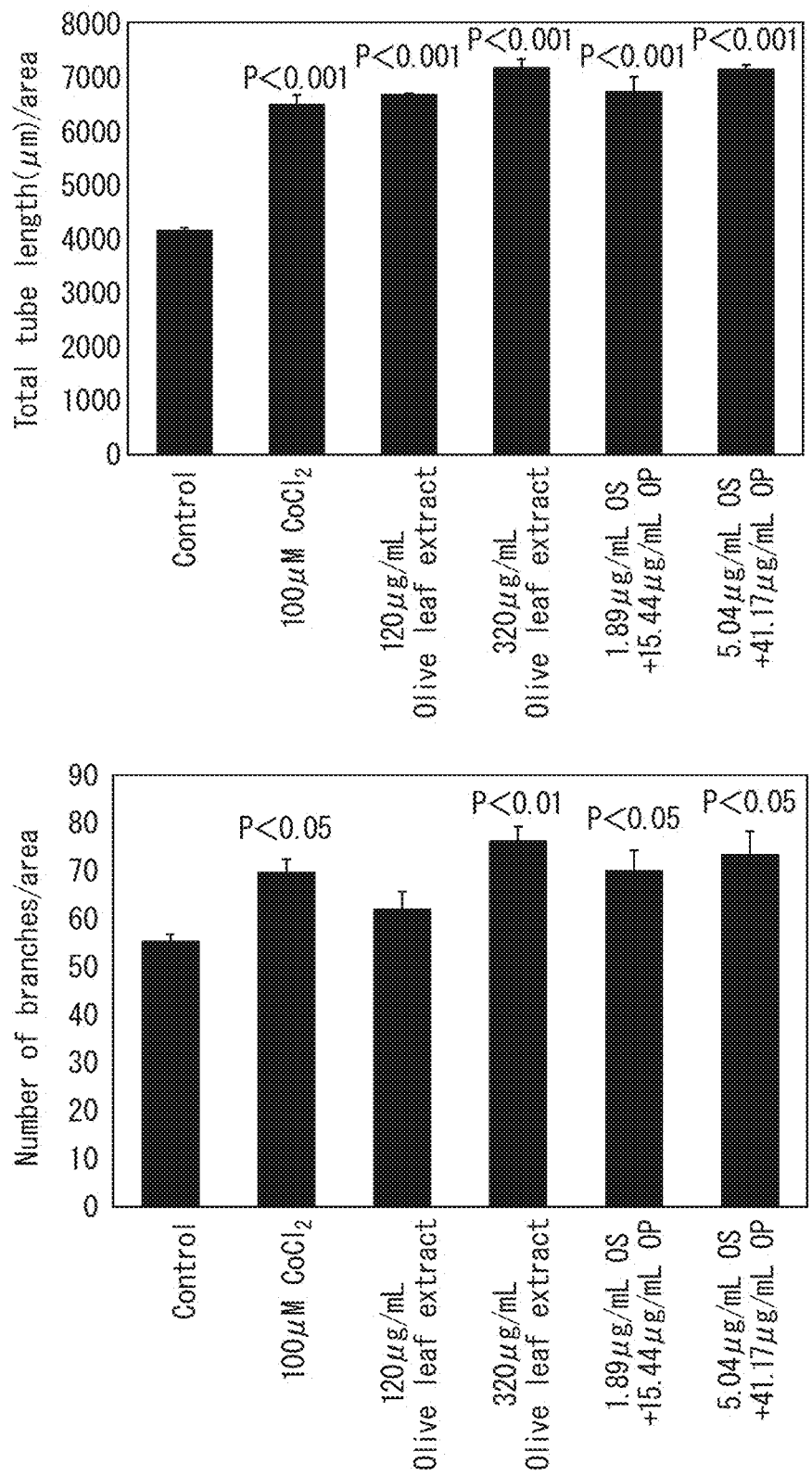
FIG. 10 shows results of examining the vascularization augmenting effects of different test substances.

(2) Sample Preparation
Olive leaf extract was dissolved in distilled water at 45.8 mg/mL, and after thoroughly stirring, it was subjected to mechanical sterilization with a 0.4 µm sterile filter for use as a stock solution. Oleuroside and oleuropein were dissolved in DMSO to concentrations of 5.04 mg/mL and 41.2 mg/mL, respectively, for use as stock solutions. Cobalt (III) chloride hexahydrate was dissolved in distilled water to 10 mM for use as a stock solution.
(3) Vascularization Test
(a) Preparation of Matrigel Wells
An extracellular matrix solution thawed at 4° C. from the previous day was dispensed at 50 µL into each well of a 96-well plate, and heated for 1 hour at 37° C. for gel solidification.
(b) Preparation of Cell Solution
The cell suspension of (1) was adjusted to $2.5 \times 10^4$ cells/50 µL with HUVEC special medium.
(c) Preparation of Test Substance Solutions
Each stock solution prepared in (2) was adjusted to a final concentration of 2-fold with HUVEC special medium.
(d) After adding 50 µL of cell solution (b) and 50 µL of test substance solution (c) onto the gel prepared in (a), culturing of the plate was initiated in a $CO_2$ incubator (5% $CO_2$, 37° C.).
(e) Each well was constantly observed with a phase contrast microscope from 0 to 20 hours after the start of culturing to confirm the state of vascularization. Photographs were taken when differences were apparent between the treated groups (9 hours after start of culturing), and the state of vascularization was quantified from the microscope images.
(f) Image Analysis
Image analysis software was used to calculate the tube lengths (µm) and number of branches (branch count) based on the observation images of the well centers.
The results are shown in FIG. 10. The tube lengths and branch counts were all significantly increased compared to the control for the olive leaf extract and combinations of oleuropein and oleuroside. This suggested a promoting effect on vascularization.

<MHIF-1α Protein Production Promotion Test>
Test Methods
(1) Test Substances
The test substances used were olive leaf extract, oleuroside, oleuropein and $CoCl_2$ (positive control substance).
(2) Cells
Human umbilical vein endothelial cells (HUVEC) (pre-screened) (Cat. No. C2519AS, Lot No. 0000635747, LONZA) were used for the experiment.
(3) Reagents and Devices
EGM™-2, BulletKit™ (Cat. No. CC-3162, LONZA)
DMSO (Cat. No. 13445-74, Nacalai Tesque)
Oleuropein (Cat. No. 00420, Lot No. 5, GACK-WA, TCI, Japan)
Oleuroside (Cat. No. orb594438, Biorbyt)
Cobalt (II) chloride hexahydrate (Cat. No. 036-03682, FujiFilm-Wako Pure Chemical Industries, Japan)
2.5 g/1-trypsin/1 mmol/1-EDTA solution (Cat. No. 32777-44, Nacalai Tesque)
PBS (Code 05913, Nissui Pharmaceutical Co., Ltd.)
Human HIF-1 alpha ELISA kit (Cat. No. ab171577, Abcam)
BCA protein assay kit (Cat. No. T9300, Takara)
Absorption, fluorescence and luminescence plate reader (Varioskan LUX, ThermoFisher)
75 $cm^2$ cell culture flask (Cat. No. 3276, Corning)
Adherent cell culture plate 96F (Cat.MS-8096F, SUM-ILON).

Adherent cell culture plate 6F (Cat.MS-8060F, SUMILON).

1.5 mL Ring lock micro tube (Cat. No. BM-15, BM Equipment Co., Ltd.)

Methods (1) Culturing of HUVEC Cells

HUVEC cells were precultured using special medium in a C02 incubator (5% C02, 37° C.) inside a T75 flask, to the necessary cell count. For subculturing of the cells, trypsin/EDTA solution was used to separate the cells from the flask and the trypsin was neutralized with test medium, after which the cells were recovered by centrifugation and resuspended in test medium for use as a cell suspension.

(2) Sample Preparation

Olive leaf extract was dissolved in distilled water at 45.8 mg/mL, and after thoroughly stirring, it was subjected to mechanical sterilization with a 0.4 μm sterile filter for use as a stock solution. Oleuroside and oleuropein were dissolved in DMSO to concentrations of 5.04 mg/mL and 41.2 mg/mL, respectively, for use as stock solutions. Cobalt (III) chloride hexahydrate was dissolved in distilled water to 10 mM for use as a stock solution.

(3) Cell Culturing

The HUVEC cells obtained in (1) were seeded in a 6-well plate at $3 \times 10^5$ cells/2 mL/well, using special medium. Culturing was carried out for 1 day in a $CO_2$ incubator (5% $CO_2$, 37° C.). The medium was then replaced with special medium containing the test substance at 2 mL/well, and culturing was continued. At 0, 4, 12 and 24 hours after the start of culturing, the culture supernatant was removed, and 2 mL of PBS was added for rinsing and then removed. The plate was stored at −80° C. until protein measurement.

(4) HIF-1α Protein Level Measurement

Figure 11:
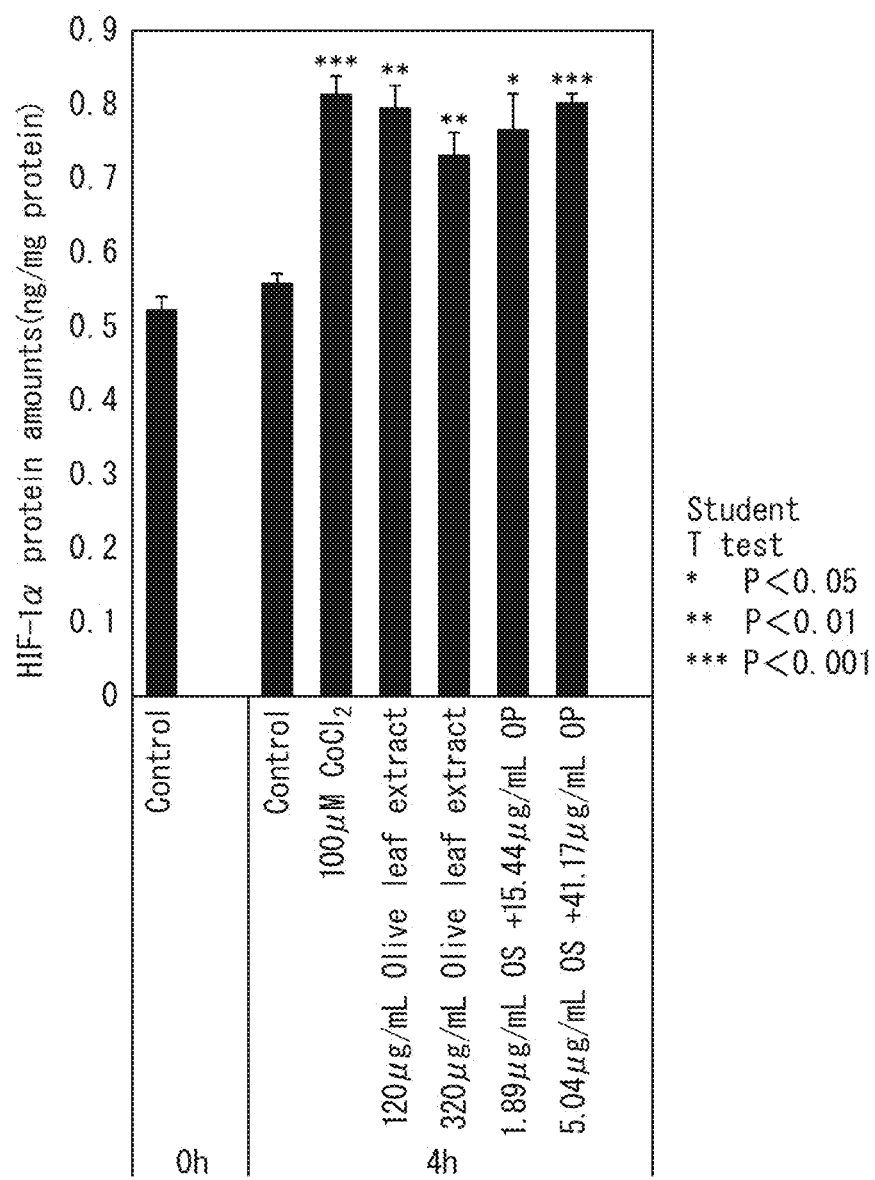
FIG. 11 shows results of examining HIF-1α protein production by HUVEC cultured cells using different test substances.

Measurement of the HIF-1α protein was carried out with a human HIF-1 alpha ELISA kit (Abcam), according to the manufacturer's protocol. The results are shown in FIG. 11. Addition of olive leaf extract and combinations of oleuropein and oleuroside significantly increased HIF-1α protein levels, confirming that HIF-1α stabilizes with accumulating protein level.

<Tie2 Gene Expression Promoting Effect>

Test Methods

Testing was conducted by the same method as for HIF-1α protein measurement, but partially modified as follows.

(5) Cell Culturing

The HUVEC cells obtained in (1) were seeded in a 12-well plate at $3 \times 10^5$ cells/1 mL/well, using special medium. Culturing was carried out for 1 day in a $CO_2$ incubator (5% $CO_2$, 37° C.). The medium was then replaced with special medium containing the test substance at 1 mL/well, and culturing was continued. At 0, 2, 4 and 8 hours after the start of culturing, the culture supernatant was removed, and 1 mL of PBS was added for rinsing and then removed. The plate was stored at −80° C. until RNA extraction.

(6) Recovery of Total RNA

The total RNA was extracted using an RNeasy Plus Mini kit (Qiagen). The details are described below.

(i) 350 μL of RLT Plus buffer was added to the plate wells prepared in (5).

(ii) The homogenized solution was transferred to a QIAshredder and centrifuged at 15,000×g for 2 minutes.

(iii) The supernatant in the collection tube was placed in a gDNA Eliminator column and centrifuged at 8000×g for 30 seconds.

(iv) An equivalent amount of 70% ethanol (350 μL) was added to the flow-through liquid and the mixture was neutralized by pipetting.

(V) 700 μL of the solution of (iv) was transferred to an RNeasy spin column and centrifuged at 8000×g for 20 seconds. The flow-through liquid was discarded.

(vi) 700 μL of Buffer RW1 was added to an RNeasy spin column and centrifuged at 8000×g for 20 seconds. The flow-through liquid was discarded.

(vii) 500 μL of RPE buffer was added to an RNeasy spin column and centrifuged at 8000×g for 20 seconds. The flow-through liquid was discarded.

(viii) 500 μL of RPE buffer was added to an RNeasy spin column and centrifuged at 8000×g for 2 minutes. The flow-through liquid was discarded.

(ix) The RNeasy spin column was transferred to a fresh 2 mL collection tube and centrifuged at 15,000×g for 1 minute.

(x) The RNeasy spin column was transferred to a fresh 1.5 mL collection tube, 10 μL of RNase-free water was added, and the mixture was centrifuged at 8000×g for 1 minute. The solution that collected in the flow-through was used as total RNA.

(7) Conversion to cDNA

Conversion of the total RNA to cDNA was carried out according to the protocol of a PrimeScript™ RT reagent kit. The details are described below.

(a) Each solution was added to a PCR tube, with the following composition.

Total RNA: 5 μL
5×PrimeScript buffer: 2 μL
PrimeScript RT enzyme mix: 0.5 L
Oligo dT primer: 0.5 μL
Random 6mer: 0.5 μL
RNase-free dH$_2$O: 1.5 μL (b) The tube was treated at 37° C. for 15 minutes, at 85° C. for 5 seconds, and at 4° C.

The cDNA solution was used as template for real-time PCR.

(8) Real-Time PCR (a) A reaction mixture was prepared in a real-time PCR specialized tube in the following manner and used for PCR reaction.

dsH$_2$O 2.4 μl
SYBER Premix Ex Taq 4.0 μl
Forward primer (20 μM) 0.3 μl
Reverse primer (20 μM) 0.3 μl
Synthetic cDNA 1.0 μl
Total volume 8.0 μl The specific primers for each gene used in the test and the PCR reaction conditions were as shown below.

[Table 5]

TABLE 5

| Gene | Direction | Sequence (5'→3') |
|------|-----------|------------------|
| VEGFA | Forward | TTGCCTTGCTGCTCTACCTCCA (SEQ ID NO: 11) |
|       | Reverse | GATGGCAGTAGCTGCGCTGATA (SEQ ID NO: 12) |

TABLE 5-continued

| Gene | Direction | Sequence (5'→3') |
|---|---|---|
| TIE2 | Forward | GGTCAAGCAACCCAGCCTTTTC (SEQ ID NO: 13) |
|  | Reverse | CAGGTCATTCCAGCAGAGCCAA (SEQ ID NO: 14) |
| GAPDH | Forward | CATCCCTGCCTCTACTGGCGCTGCC (SEQ ID NO: 15) |
|  | Reverse | CCAGGATGCCCTTGAGGGGCCCTC (SEQ ID NO: 16) |

The reaction conditions (PCR temperature conditions, cycle count) were as follows:
(a) Polymerase activation: 30 sec at 95° C.;
(b) PCR cycling: 60 cycles of 10 sec at 95° C., 30 sec at 60° C.
(c) Melting curve: 15 sec at 95° C., 15 sec at 55° C., 15 sec at 95° C.

(2) Calculation of Relative Quantities

Figure 12:
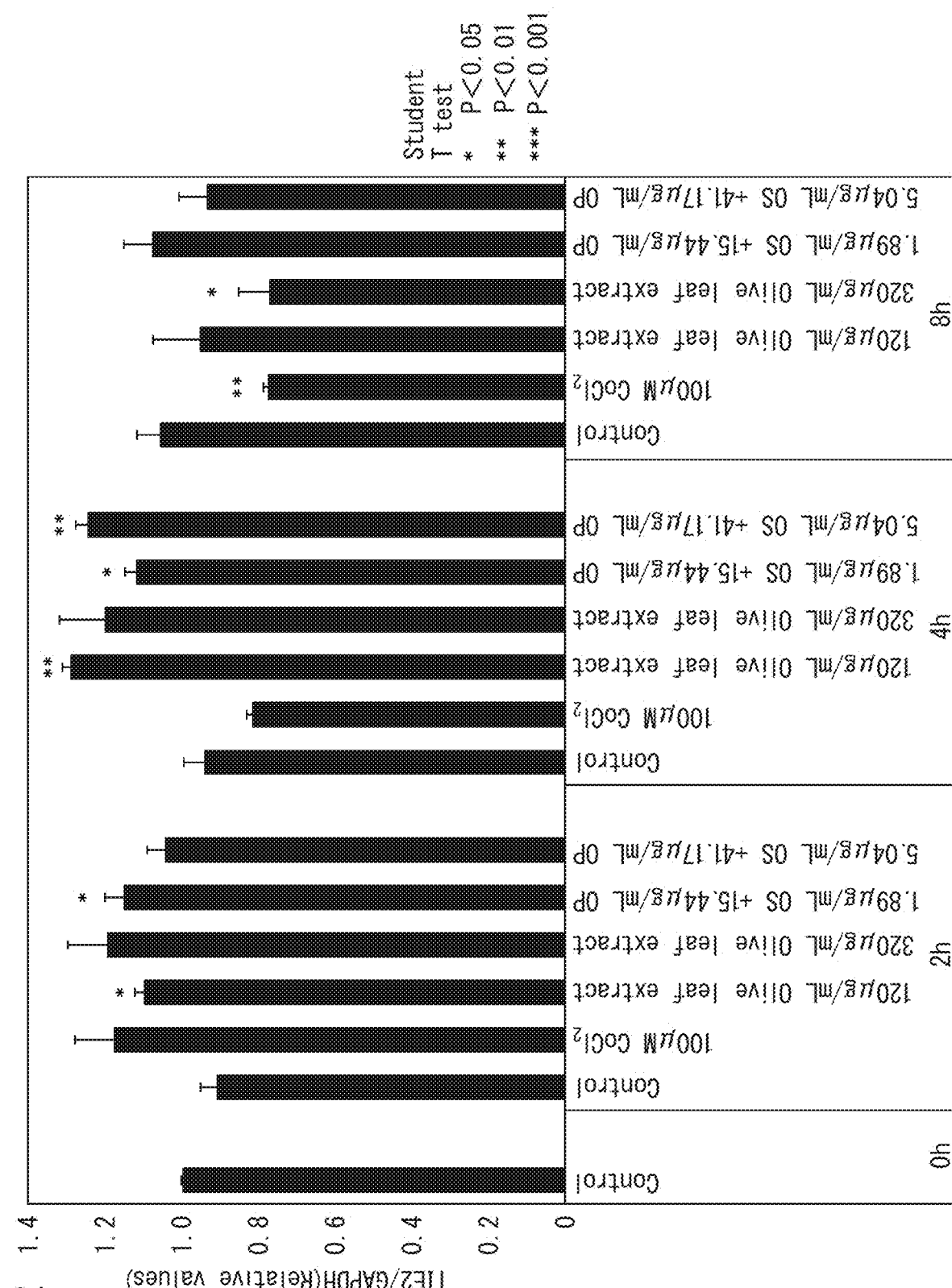
FIG. 12 shows results of examining the Tie2 gene expression promoting effects of different test substances.

The Ct value (PCR cycle count) was calculated as the intersection between the amplification curve and threshold line for each gene. It was obtained by subtracting the Ct value of the internal standard GAPDH gene from the Ct value of the target gene (Ct (target gene)–Ct (βACT)=ΔCt value). In addition, the mean ΔCt value of a blank was subtracted from the ΔCt value, as ΔCt (sample treatment group)–ΔCt (blank group)=ΔΔCt value. The value of $2^{-\Delta\Delta Ct}$, with the value of ΔΔCt replacing the multiplier term, is the relative expression level. The results are shown in FIG. 12. The results suggested that activation of the Ang/Tie2 signal pathway. They also suggested that the HIF-1 signal regulates Ang/Tie2, reinforcing adhesion between hematopoietic stem cells and the niche and supporting the undifferentiated state of stem cells.

Example 5: Ex Vivo Test

An ex vivo culture test with human skin tissue was carried out according to the method of Laboratoire BIO-EC (France) (Asserin et al., 2015), by the same company. Skin tissue slices created by abdominoplasty were obtained from a 55-year-old white woman (Phototype II based on the Fitzpatrick skin color classification), and were cut to a mean diameter of 12±1 mm. Using BIO-EC's Explants Medium Complete (BIO-EC, France) as the culture solution, the tissue slices were cultured for 10 days under conditions of 37° C., 5% $CO_2$.

Four groups were defined, a tissue control group (T0), a control group (T), a WOL (120 μg/mL)-treated group (P1) and a WOL (240 μg/mL)-treated group (P2). WOL was added to a concentration of 120 μg/mL in the WOL (120 μg/mL)-treated group, and WOL was added to a concentration of 240 μg/mL in the WOL (240 μg/mL)-treated group.

The culture solution was replaced on days 3, 4, 5, 6 and 7, and the experiment was conducted with 3 slices per group. The 3 slices of group T0 were cut into 3 portions on day 0 of culturing. A ⅓ portion was fixed with formalin buffer, a ⅓ portion was frozen at −80° C., and a ⅓ portion was stored with RNAlater$^R$ buffer for genomic analysis. On the 5th day and 10th day of culturing, the 3 slices of each group were processed in the same manner as group T0.

The formalin buffer-fixed slice of each group was embedded in paraffin after fixing and dehydration. Slices were then prepared and observed under an Olympus Corp. BX43 or BX63 microscope (Olympus Corp.). Photographs were digitalized using an Olympus Corp. DP72 or DP74 camera (Olympus Corp.) and cellSens storing software (Olympus Corp.). The cell survival rates for the epidermis and dermis structure were evaluated by observing the formalin-fixed paraffin-embedded skin slices (FFPE) with a microscope after Masson-Goldner staining.

<Evaluation of Dermal-Epidermal Junction (DEJ)>

The DEJ relief index is the ratio of DEJ length to epidermis length, with a larger ratio representing more irregularities in the basal membrane and a younger state. The DEJ relief indexes of all of the groups were measured using stained photographs. The measurement was carried out using the measurement module of cellSens image analysis software.

<Quantitation of HIF-1α and PECAM-1 Protein>

The FFPE slices were immunostained with anti-HIF-1α antibody (Ref.HPA001275, Sigma-Aldrich, USA) or anti-Pecam-1 antibody (ref.sc-376764, Santa Cruz, USA), which had been diluted to 1:100 with PBS-BSA (0.3%)-Tween 20 (0.05%). A Vectastain Kit Vector Amplifier system avidin/biotin was used for incubation at room temperature for 1 hour, and staining was carried out with a VIP (Ref. SK-4600, Vector Laboratories, USA). Immunostaining was evaluated by microscopic observation and image analysis. The ratio of the stained surface area and the total area was calculated and represented as the staining area (%). Image analysis was carried out with a total of 9 images per group, making evaluation based on the average value. Statistical testing by Student's t test was used for comparison of the image analysis results between the groups, with a statistical significance level of 5% on both sides.

<Evaluation of Dermal Stem Cell Count>

For dermal stem cells, increase in CD271-positive/NG2-positive cells of the dermal papillary layer was examined (day 10 of high concentration).

Double immunostaining with CD271 and NG2

FEPE slices were immunostained using anti-CD271 monoclonal antibody (ref. MA5-13314, Invitrogen) diluted to 1:50 with PBS-BSA (0.3%)-Tween 20 (0.05%) and anti-NG2 monoclonal antibody (ref.ab255811, Abcam) diluted to 1:100 with PBS, BSA (0.3%)-Tween 20 (0.05%). CD271 was clarified with AF488 (Life Technologies, ref. A11001, Abcam) (green stain), while NG2 was clarified with AF594 (ref. A11012, Life Technologies, USA) (red stain). The nuclei were contrast stained with DAPI (blue stain). The number of CD271-positive/NG2-positive cells determined by immunostaining was recorded as the cell count, and represented as CD271-positive/NG2-positive cells per 1 mm2 dermal papillary layer.

<Gene Expression Analysis>

RNA Extraction

A ReliaPrep RNA Kit (fibrous tissue) (Promega, USA) was used for extraction of RNA samples from the skin slices on the 5th day and 10th day of culturing, according to the method of the kit. A 100 ng portion of extracted RNA was reverse transcripted to cDNA using iScript (Bio-Rad, USA), with RT reaction being verified by spike (exogen RNA) control. The target gene expression was evaluated with qPCRarray. For quantification of gene expression, the number of cycles was normalized based on two reference genes (GAPDH and B2M).

Results

Improvement of DEJ Relief Index

After 10 days of culturing, the DEJ relief index improved as follows: group T: 1.25±0.21 (mean±SD), group P1: 1.45±0.26; therefore, WOL addition produced a significant improvement in DEJ relief index. Irregularities in the dermal papillary layer increased and the basal membrane improved, as improvement in skin aging features.

HIF-1α Inducing Effect

The analysis results for HIF-1α (surface %) after 10 days of culturing were as follows: group T: 82.6±4.8%, group P1: 94.6±2.3%; therefore, WOL addition significantly increased HIF-1α ($p<0.05$). This suggested that WOL induces HIF-1α and increases it on the protein level even in skin. It has been reported that significant increase in HIF-1α expression is positively correlated with induction of HES1 (hes family bHLH transcription factor 1) and FLG (filaggrin) (PMID: 26094772, PMID: 24999590), and since HIF-1α was observed, as a necessary regulatory factor for keratinocyte differentiation and epidermal barrier function, it was potentially promoting epidermis turnover.

PECAM1-Inducing Effect

The analysis results for PECAM1 (surface %) after 5 days of culturing were as follows: group T: 0.8±0.3%, group P2: 1.1±0.5%; therefore WOL addition significantly increased PECAM1 ($p<0.05$). Since PECAM1 was increased, as a vascular endothelial precursor cell marker, this suggested a vascularizing effect by WOL.

Dermal Stem Cell-Increasing Effect

The CD271-positive/NG2-positive cell count results after 10 days of culturing in the dermal papillary layer were as follows: group T: 178±54, group P2: 228±33 (mean±SD), thus showing a significant increase ($p<0.05$ with respect to group T). This suggested an effect of promoting increase in dermal stem cell count in the dermal papillary layer.

[Table 6]

TABLE 6

| | CD271-positive/NG2-positive cell count in dermal papillary layer/mm$^2$ | | |
|---|---|---|---|
| | T | P1 | P2 |
| Mean ± SD | 178 ± 54 | 201 ± 30 | 228 ± 33 |

CD271-positive/NG2-positive cells in the dermal papillary layer were thereby increased, suggesting an effect of increasing expression of dermal stem cell markers.

Gene Expression-Inducing Effect

Figure 13:
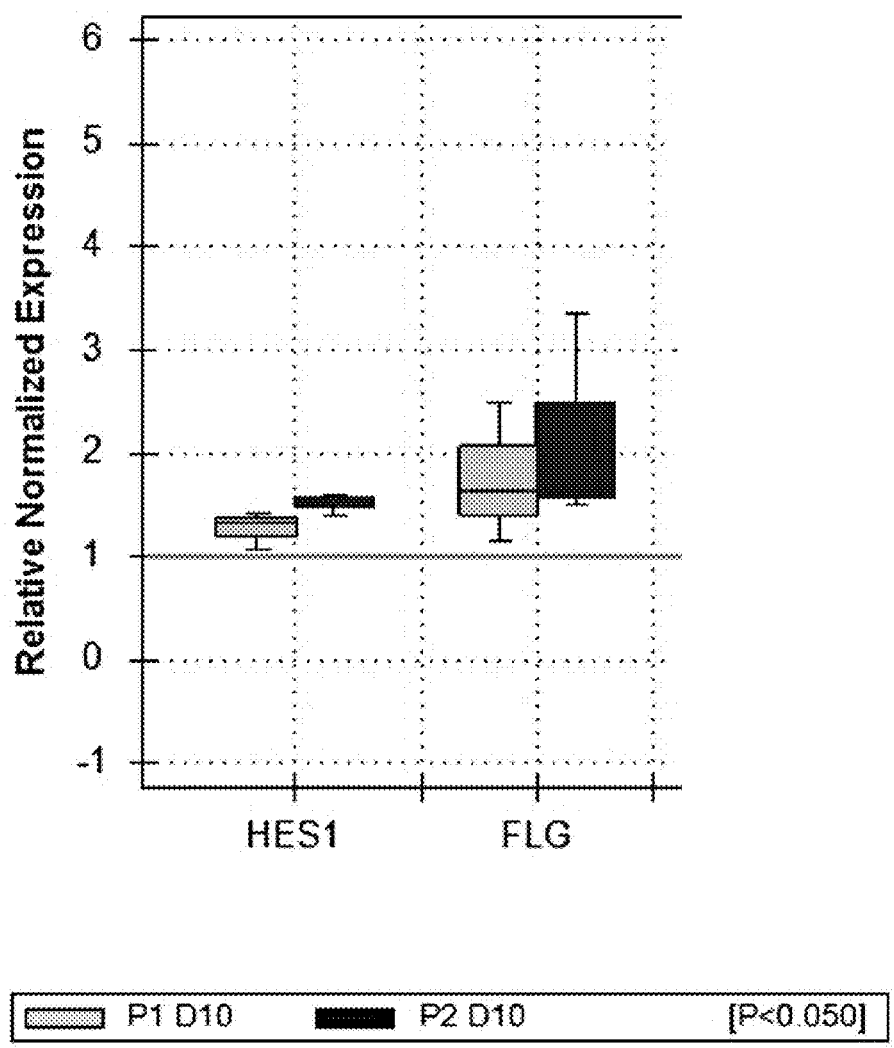
FIG. 13 is a graph showing improvement in skin aging of human skin tissue, using olive leaf extract.

The results of Hes1 gene expression analysis after 10 days of culturing were: 1.27 for group P1 and 1.51 for group P2 with respect to 1 for group T, and expression was significantly increased in group P2 compared to the group T (FIG. 13, $p<0.05$). Increase in Hes1 due to WOL addition indicates that differentiation of epidermal stem cells to epidermis had been progressively induced. Filaggrin tended to have increased expression ($p=0.08$), suggesting that epidermis turnover had been promoted by increased differentiation of epidermal stem cells.

HIF-1 and Epidermal Stem Cell-Activating Effect in Human Skin Ex Vivo Test

Epidermal stem cell increase and differentiation were examined using HIF-1α, filaggrin, laminin 5 and CK15 as markers. CK15 has been indicated as an epidermal stem cell marker (see Bose et al., Keratin K15 as a Biomarker of Epidermal Stem Cells, Int. J. Mol. Sci. 2013, 14, 19385-19398).

An ex vivo culture test with human skin tissue was carried out in the same manner as described above, according to the method of Laboratoire BIO-EC (France), by the same company. Skin tissue slices created by abdominoplasty were obtained from a 52-year-old white woman (Phototype II based on the Fitzpatrick skin color classification), and were cut to a mean diameter of 12±1 mm. Using BIO-EC's Explants Medium Complete (BIO-EC) as the culture solution, the tissue slices were cultured for 9 days under conditions of 37° C., 5% $CO_2$.

Three groups were defined, a tissue control group (T0), a control group (T) and a WOL (100 μg/mL)-treated group (P). WOL was added to a concentration of 100 μg/mL for the WOL (100 μg/mL)-treated group.

The culture solution was replaced on days 1, 2, 5, 6, 7 and 8, and the experiment was conducted with 3 slices per group. The 3 slices of group T0 were cut into 3 portions on day 0 of culturing. A ⅓ portion was fixed with formalin buffer, a ⅓ portion was frozen at −80° C., and a ⅓ portion was stored with RNAlater$^R$ buffer for genomic analysis. On the 5th day and 9th day of culturing, the 3 slices of each group were processed in the same manner as group T0.

The formalin buffer-fixed slice of each group was embedded in paraffin after fixing and dehydration. Slices were then prepared and observed under a Leica DMLB (Leica, Germany) or Olympus BX43 or BX63 microscope (Olympus Corp.). Photographs were digitalized using an Olympus Corp. DP72 or DP74 and cellSens storing software (Olympus Corp.). The cell survival rates for the epidermis and dermis structure were evaluated by observing the formalin-fixed paraffin-embedded skin slices (FFPE) with a microscope after Masson-Goldner staining.

Tissue immunostaining of FEPE was with HIF-1α antibody (HPA001275, Sigma-Aldrich), anti-filaggrin antibody (sc-66192, clone AKH1, Santa Cruz), anti-CK15 antibody (sc-70912, clone O.N.360, Santa Cruz) and anti-laminin 5 antibody (sc-13587, clone P3E4, Santa Cruz), each diluted with PBS-BSA 0.3%-Tween 20 0.05% for incubation at room temperature for 1 hour, and the results were displayed with a Vectastain Kit Vector amplifier system avidin/biotin, VIP (SK-4600, Vector Laboratories). The nuclei were contrast stained with propidium iodide.

Immunostaining was evaluated by microscopic observation and semi-quantified by image analysis. The results on the 9th day of culturing for group P with respect to group T were: HIF-1α (27.6±2.3, $p<0.05$ with respect to 21.0±8.0), filaggrin (42.0±9.2, $p<0.05$, with respect to 31.3±9.0), CK15 (11.5±6.6, $p<0.05$, with respect to 6.1±2.6) and laminin 5 (44.3±8.2, $p<0.01$, with respect to 26.5±8.7), and therefore HIF-1α expression significantly increased, laminin 5 increased under regulation by HIF-1, and expression of the epidermal stem cell marker CK15 also increased, with observable increase in expression of the epidermis granular layer differentiation marker filaggrin. These results suggested that increased HIF-1 expression promoted differentiation and also self-propagation of epidermal stem cells.

Example 6: HIF-1 Activating Effect by Changing Oleuroside (OS):Oleuropein (OP) Proportion An additional test was carried out in order to confirm the effect on HIF-1 expression by changing the OS:OP proportion.

Preparation of Test Substances

OS (Cat. No. HYN6906, MedChemExpress, USA) and OP (Cat. No. 02420, TCI) were dissolved in DMSO at 10 mg/mL and 100 mg/mL, respectively, and used as stock solutions.

Cell Preparation

K562 cells (Cat. No. JCRB0019, Lot No. 06032020, JCRB, Japan) were cultured to the necessary cell count in a T75 flask in a $CO_2$ incubator (5% $CO_2$, 37° C.), using RPMI-1640 growth medium (Cat. No. R8758-500 ML, Sigma-Aldrich) and 10% FBS (Cat. No. F7524, Sigma-Aldrich) (inactivated).

Cell Culturing

K562 cells were seeded in a T25 flask at $1×10^7$ cells/10 mL using growth medium, and cultured for 1 day in a $CO_2$ incubator (5% $CO_2$, 37° C.). 10 mL of growth medium containing the analyte (2-fold concentration) was added, and after 0, 10, 30 minutes and 1, 2, 3, 5 hours, 1 mL of harvest culture solution was collected in a 1.5 mL tube and centrifuged at 1,000 rpm for 5 minutes, and the supernatant was removed. After adding 1 mL PBS to the precipitate (cells) and again centrifuging at 1,000 rpm for 5 minutes, 100 μL of RIPA Lysis buffer (Cat. No. SC-24948, Santa Cruz) was added to the resulting precipitate for suspension. After elution at 4° C. for 10 minutes and centrifugation at 12,000 rpm for 10 minutes, a ¼ amount of 4×Laemmli Sample buffer (Cat. No. 1610747, BIO-RAD) was added to the supernatant, reaction was carried out at 95° C. for 5 minutes, and the mixture was stored at −20° C. until use for electrophoresis.

Western Analysis

SDS-PAGE and Transcription to Membrane

After setting e-PAGEL HR SDS-PAGE gel (EHR-T15L, Cat. No. 2331965, ATTO, Japan) in an electrophoresis tank (AE-6530, ATTO), the lower tank and upper tank were filled with 1×electrophoresis buffer (Cat. No. 184-01291, FujiFilm-Wako Pure Chemical Industries, Japan). Electrification was carried out for 10 minutes at 10 mA. There were loaded into each well 25 μL of protein extract and Precision Plus Protein Dual Color Standards (Cat. No. 161-0394, Bio-Rad) (3 μL/well) and Biotinylated Protein Ladder Marker (10 μL/well). Electrophoresis was conducted at CC 30 mA until the bromophenol blue line reached the lower edge of the gel. The electrophoresed gel was separated from the glass plate and transferred to a PVDF membrane using EzBlot (Cat. No. 2332600, Atto), according to the instructions by Atto.

Western Blotting

After rinsing the transferred membrane with 25 mL of 1×TBS (pH 7.4) (Cat. No. 317-90175, Nippon Gene Co., Ltd.), it was immersed in TBST (1×TBS containing 0.05% Tween-20 (Cat. No. 23926-35, Nacalai Tesque)) including 25 mL of blocking buffer (0.5% BSA) (Cat. No. 017-15141, FujiFilm-Wako Pure Chemical Industries) at room temperature, for incubation. Rinsing with 15 mL of TBST was performed 3 times for 5 minutes each time. The membrane and 10 mL of TBST-BSA (0.5% BSA) including anti-HIF-1α antibody (Cat. No. GTX127309, Genetex, Inc., USA) (1/1000 amount) or PAct antibody (Cat. No. GTX109639, Genetex, Inc.) (1/3000 amount), and 0.05% sodium azide (Cat. No. 197-11091, FujiFilm-Wako Pure Chemical Industries), were added to a Hybribag, which was sealed to avoid inclusion of air bubbles. The membrane was reacted overnight at room temperature (primary antibody reaction). The membrane was then rinsed with 15 mL of TBST, 3 times for 5 minutes each time. The membrane and 10 mL of blocking buffer including anti-rabbit IgG and HRP-binding antibody (Cat. No. 7074S, Cell Signaling technology, USA) (1/2000 amount) were added to a Hybribag, which was sealed to avoid inclusion of air bubbles. The membrane was reacted for 1 hour at room temperature (secondary antibody reaction). The membrane was then rinsed with 15 mL of TBST, 3 times for 5 minutes each time. After incubating the membrane with 10 mL of EzWestLumiOne (Cat. No. 2332530, ATTO) for 1 minute and removing the excess solution, the bands were detected with a chemiluminescent scanner (C-DiGit, LI-COR, Japan).

Figure 14:
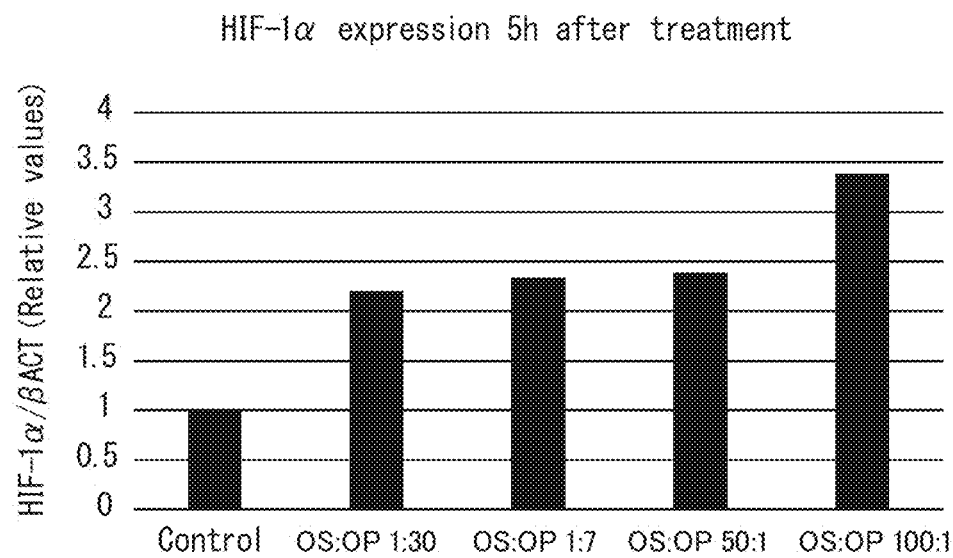
FIG. 14 is a graph showing the HIF-1 activation effect with changing oleuroside (OS):oleuropein (OP) proportion.

Quantification of Bands Images obtained by Western blotting analysis were analyzed with Image J image analysis software for quantification of the band signals. At 5 hours after test sample treatment, expression increased by 2.2-, 2.3-, 2.4- and 3.4-fold with proportions of OS:OP=1:30, OS:OP=1:7, OS:OP=50:1 and OS:OP=100:1, respectively, with the control as 1 (see FIG. 14).

Example 7: Skin Function Improving Effect in Human Open-Label Test

Ten healthy mean and women (40 to 70 years of age) were given HIF1STEM 125 mg-containing hard capsules, at 4 capsules per day, for 12 weeks. Before ingestion and 4 weeks, 8 weeks and 12 weeks after ingestion, measurement was conducted to determine the number of capillaries in the nail fold of the ring finger on the left hand or right hand, the amount of cheek moisture loss, the cheek stratum corneum water content and the skin color at the lower eyelid (tear bag and eye bag). The formulation of the HIFISTEM-containing hard capsules was as shown in Table 7.

[Table 7]

TABLE 7

| HIF1STEM-containing hard capsules | |
|---|---|
| Substance | Content (mg/capsule) |
| Olive leaf extract powder | 125.00 |
| Starch hydrolysate | 236.90 |
| Fine silicon dioxide | 3.85 |
| Calcium stearate | 19.25 |
| HPMC capsules #1 | 70.00 |

The capillaries were counted as the number of capillaries in 1 mm after photographing the capillaries in the nail fold using a B-Scan ZD (GOKO Imaging Devices Co., Ltd., Japan). The transepidermal water loss was determined using a Tewameter TM300 MP (Courage+Khazaka, Germany), making two measurements on the right cheek and taking the average. The stratum corneum water content was determined using a Corneometer CM825 MP (Courage+Khazaka, Germany), making 10 measurements on the right cheek and taking the average. The skin color was measured using a Color Difference Meter CM700d (Konica Minolta Holdings, Inc., Japan), making 10 measurements of the L value, a value and b value at the left and right lower eyelids and taking the average. Statistical testing was conducted by Student's t test, with a statistical significance level of 5% on both sides.

Figure 15:
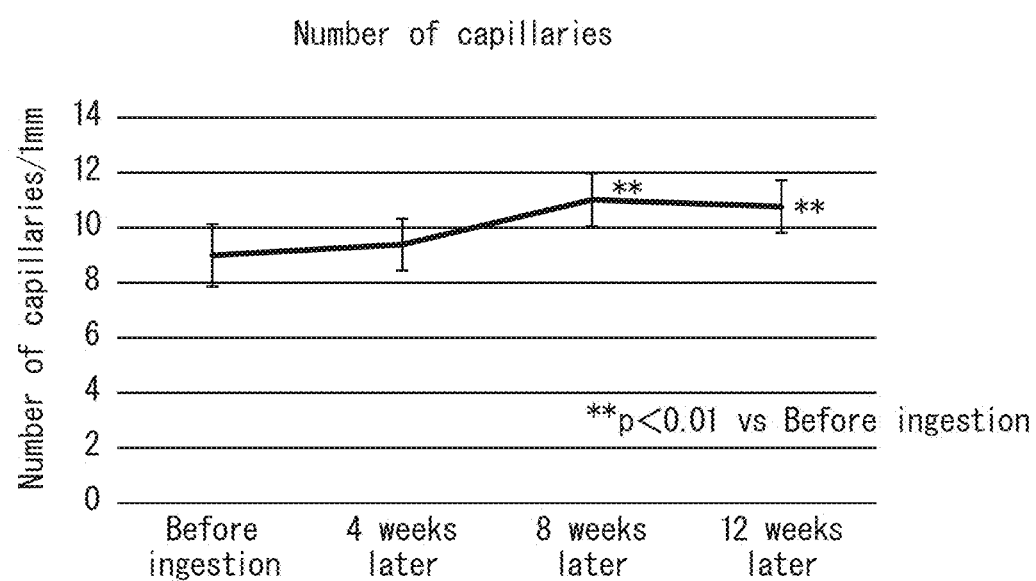
FIG. 15 is a graph showing capillary angiogenesis promoting effect in a human open-label test, based on capillary counts.
Figure 16:
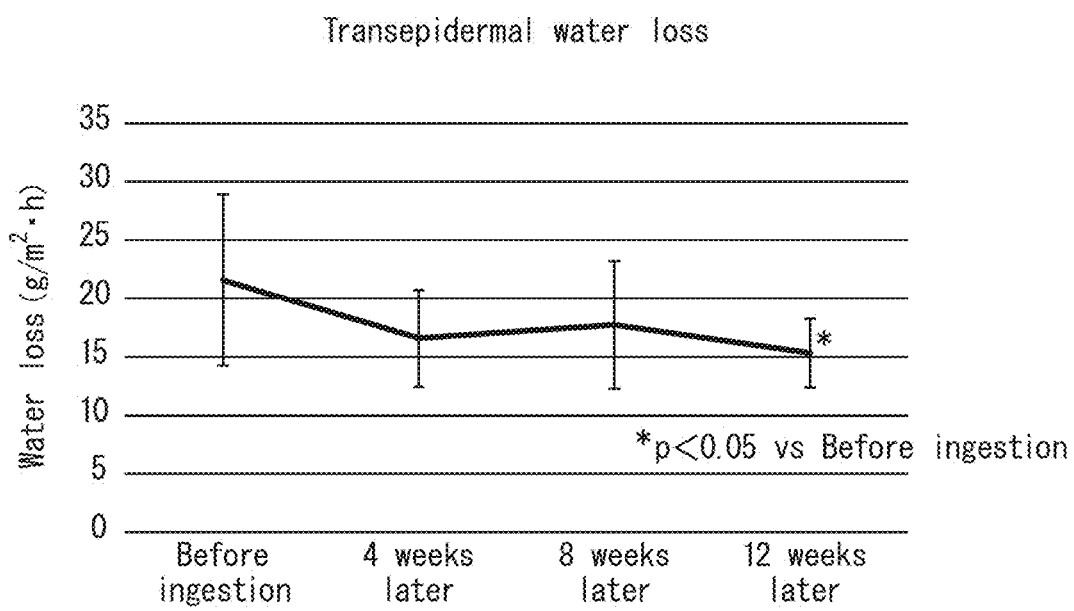
FIG. 16 is a graph showing skin function improving effect in a human open-label test, by measurement of cheek transepidermal water loss.
Figure 17:
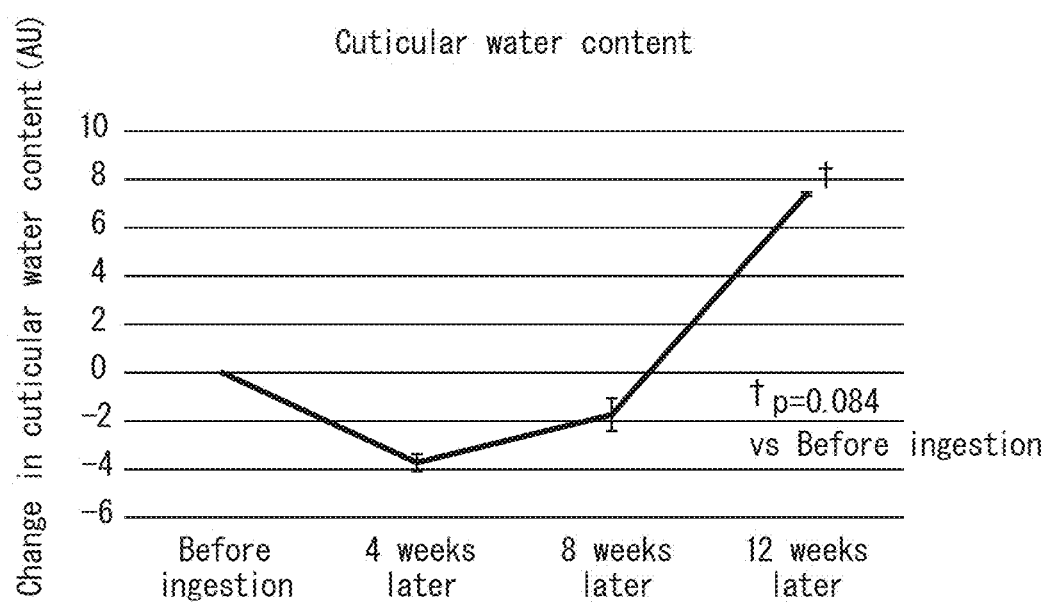
FIG. 17 is a graph showing skin function improving effect in a human open-label test, by measurement of cheek stratum corneum water content.
Figure 18:
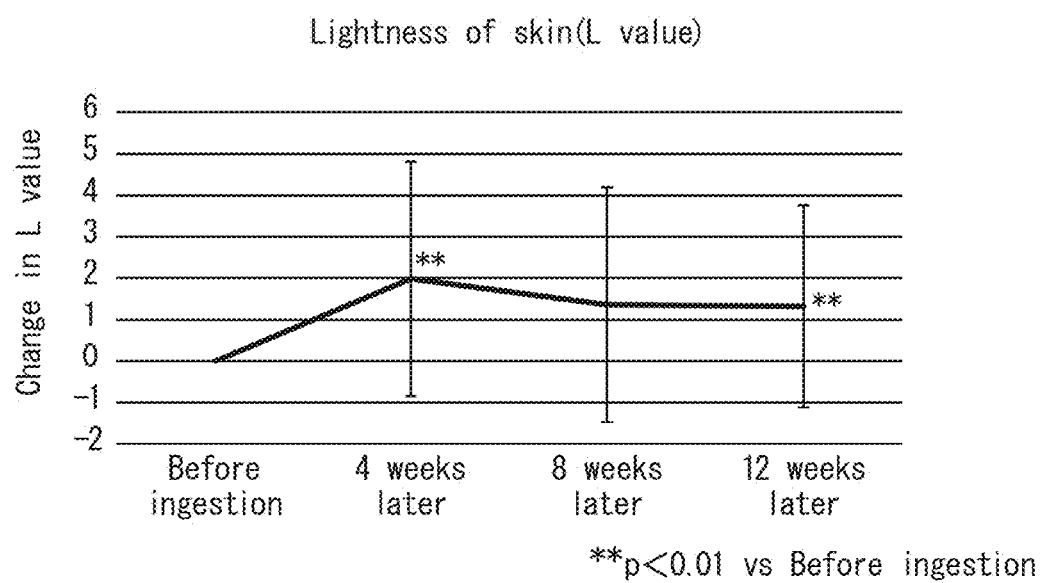
FIG. 18 is a graph showing skin function improving effect in a human open-label test, by measurement of lower eyelid (tear bag and eye bag) skin color.

As a result, the number of capillaries increased significantly after 8 weeks and 12 weeks compared to before ingestion, suggesting a vascularization effect (FIG. 15). The transepidermal water loss improved significantly after 12 weeks compared to before ingestion, suggesting an ameliorating effect on skin barrier function (FIG. 16). The stratum corneum water content tended to increase after 12 weeks compared to before ingestion, suggesting an effect of increasing skin moisturizing power (FIG. 17). The L value at the lower eyelid increased significantly after 4 weeks and after 12 weeks compared to before ingestion, suggesting an ameliorative effect on skin color due to higher lightness (FIG. 18).

INDUSTRIAL APPLICABILITY

As confirmed above, the HIF-1α activator of the invention can induce differentiation or maintain differentiation potency of stem cells, due to the excellent HIF-1a activating effect of olive leaf extract.

| [Sequence Listing] SEQUENCE LISTING | | |
|---|---|---|
| <110> | NUTRITION aCT CO., LTD. NATIONAL UNIVERSITY CORPORATION, UNIVERSITY OF TSUKUBA | |
| <120> | HIF-1 ACTIVATOR | |
| <130> | DF223388 | |
| <150> | JP2021-164352 | |
| <151> | 2021-10-05 | |
| <160> | 16 | |
| <210> | 1 | |
| <211> | 25 | |
| <212> | DNA | |
| <213> | Artificial sequence | |
| <220> | | |
| <223> | Primer | |
| <400> | 1 | |
| catccctgcc tctactggcg ctgcc | | 25 |
| <210> | 2 | |
| <211> | 25 | |
| <212> | DNA | |
| <213> | Artificial sequence | |
| <220> | | |
| <223> | Primer | |
| <400> | 2 | |
| ccaggatgcc cttgaggggg ccctc | | 25 |
| <210> | 3 | |
| <211> | 20 | |
| <212> | DNA | |
| <213> | Artificial sequence | |
| <220> | | |
| <223> | Primer | |
| <400> | 3 | |

| -continued [Sequence Listing] SEQUENCE LISTING | | |
|---|---|---|
| gagcacagag cctcgccttt | | 20 |
| <210> | 4 | |
| <211> | 22 | |
| <212> | DNA | |
| <213> | Artificial sequence | |
| <220> | | |
| <223> | Primer | |
| <400> | 4 | |
| tcatcatcca tggtgagctg gc | | 22 |
| <210> | 5 | |
| <211> | 19 | |
| <212> | DNA | |
| <213> | Artificial sequence | |
| <220> | | |
| <223> | Primer | |
| <400> | 5 | |
| cttagaggga caagtggcg | | |
| <210> | 6 | 20 |
| <211> | 20 | |
| <212> | DNA | |
| <213> | Artificial sequence | |
| <220> | | |
| <223> | Primer | |
| <400> | 6 | |
| ggacatctaa gggcatcaca | | 20 |
| <210> | 7 | |
| <211> | 21 | |
| <212> | DNA | |
| <213> | Artificial sequence | |
| <220> | | |
| <223> | Primer | |
| <400> | 7 | |

SEQUENCE LISTING

```
acggcgggag taactatgac t          21

<210>  8
<211>  18
<212>  DNA
<213>  Artificial sequence
<220>
<223>  Primer
<400>  8 cttggctgtg gtttcgct              18

<210>  9
<211>  23
<212>  DNA
<213>  Artificial sequence
<220>
<223>  Primer
<400>  9 atatgcagcc actcctagag ctc        23

<210>  10
<211>  22
<212>  DNA
<213>  Artificial sequence
<220>
<223>  Primer
<400>  10 ctggttcaga gaaatgatgg gca        23

<210>  11
<211>  22
<212>  DNA
<213>  Artificial sequence
<220>
<223>  Primer
<400>  11 ttgccttgct gctctacctc ca         22

<210>  12
<211>  22
<212>  DNA
<213>  Artificial sequence
<220>
<223>  Primer
<400>  12 gatggcagta gctgcgctga ta         22

<210>  13
<211>  22
<212>  DNA
<213>  Artificial sequence
<220>
<223>  Primer
<400>  13 ggtcaagcaa cccagccttt tc         22

<210>  14
<211>  22
<212>  DNA
<213>  Artificial sequence
<220>
<223>  Primer
<400>  14 caggtcattc cagcagagcc aa         22

<210>  15
<211>  25
<212>  DNA
<213>  Artificial sequence
<220>
<223>  Primer
<400>  15 catccctgcc tctactggcg ctgcc      25

<210>  16
<211>  25
<212>  DNA
<213>  Artificial sequence
<220>
<223>  Primer
<400>  16 ccaggatgcc cttgaggggg ccctc      25
```

SEQUENCE LISTING

```
Sequence total quantity: 16
SEQ ID NO: 1            moltype = DNA   length = 25
FEATURE                 Location/Qualifiers
misc_feature            1..25
                        note = Primer
source                  1..25
                        mol_type = other DNA
                        organism = synthetic construct
SEQUENCE: 1
catccctgcc tctactggcg ctgcc                                                 25

SEQ ID NO: 2            moltype = DNA   length = 25
FEATURE                 Location/Qualifiers
misc_feature            1..25
                        note = Primer
source                  1..25
                        mol_type = other DNA
                        organism = synthetic construct
SEQUENCE: 2
ccaggatgcc cttgagggggg ccctc                                                25

SEQ ID NO: 3            moltype = DNA   length = 20
FEATURE                 Location/Qualifiers
misc_feature            1..20
                        note = Primer
source                  1..20
                        mol_type = other DNA
                        organism = synthetic construct
SEQUENCE: 3
gagcacagag cctcgccttt                                                       20

SEQ ID NO: 4            moltype = DNA   length = 22
FEATURE                 Location/Qualifiers
misc_feature            1..22
                        note = Primer
source                  1..22
                        mol_type = other DNA
                        organism = synthetic construct
SEQUENCE: 4
tcatcatcca tggtgagctg gc                                                    22

SEQ ID NO: 5            moltype = DNA   length = 19
FEATURE                 Location/Qualifiers
misc_feature            1..19
                        note = Primer
source                  1..19
                        mol_type = other DNA
                        organism = synthetic construct
SEQUENCE: 5
cttagaggga caagtggcg                                                        19

SEQ ID NO: 6            moltype = DNA   length = 20
FEATURE                 Location/Qualifiers
misc_feature            1..20
                        note = Primer
source                  1..20
                        mol_type = other DNA
                        organism = synthetic construct
SEQUENCE: 6
ggacatctaa gggcatcaca                                                       20

SEQ ID NO: 7            moltype = DNA   length = 21
FEATURE                 Location/Qualifiers
misc_feature            1..21
                        note = Primer
source                  1..21
                        mol_type = other DNA
                        organism = synthetic construct
SEQUENCE: 7
acggcgggag taactatgac t                                                     21

SEQ ID NO: 8            moltype = DNA   length = 18
FEATURE                 Location/Qualifiers
misc_feature            1..18
                        note = Primer
source                  1..18
                        mol_type = other DNA
                        organism = synthetic construct
```

```
SEQUENCE: 8
cttggctgtg gtttcgct                                                           18

SEQ ID NO: 9            moltype = DNA   length = 23
FEATURE                 Location/Qualifiers
misc_feature            1..23
                        note = Primer
source                  1..23
                        mol_type = other DNA
                        organism = synthetic construct
SEQUENCE: 9
atatgcagcc actcctagag ctc                                                     23

SEQ ID NO: 10           moltype = DNA   length = 23
FEATURE                 Location/Qualifiers
misc_feature            1..23
                        note = Primer
source                  1..23
                        mol_type = other DNA
                        organism = synthetic construct
SEQUENCE: 10
ctggttcaga gaaatgatgg gca                                                     23

SEQ ID NO: 11           moltype = DNA   length = 22
FEATURE                 Location/Qualifiers
misc_feature            1..22
                        note = Primer
source                  1..22
                        mol_type = other DNA
                        organism = synthetic construct
SEQUENCE: 11
ttgccttgct gctctacctc ca                                                      22

SEQ ID NO: 12           moltype = DNA   length = 22
FEATURE                 Location/Qualifiers
misc_feature            1..22
                        note = Primer
source                  1..22
                        mol_type = other DNA
                        organism = synthetic construct
SEQUENCE: 12
gatggcagta gctgcgctga ta                                                      22

SEQ ID NO: 13           moltype = DNA   length = 22
FEATURE                 Location/Qualifiers
misc_feature            1..22
                        note = Primer
source                  1..22
                        mol_type = other DNA
                        organism = synthetic construct
SEQUENCE: 13
ggtcaagcaa cccagccttt tc                                                      22

SEQ ID NO: 14           moltype = DNA   length = 22
FEATURE                 Location/Qualifiers
misc_feature            1..22
                        note = Primer
source                  1..22
                        mol_type = other DNA
                        organism = synthetic construct
SEQUENCE: 14
caggtcattc cagcagagcc aa                                                      22

SEQ ID NO: 15           moltype = DNA   length = 25
FEATURE                 Location/Qualifiers
misc_feature            1..25
                        note = Primer
source                  1..25
                        mol_type = other DNA
                        organism = synthetic construct
```

```
SEQUENCE: 15
catccctgcc tctactggcg ctgcc                                             25

SEQ ID NO: 16           moltype = DNA  length = 25
FEATURE                 Location/Qualifiers
misc_feature            1..25
                        note = Primer
source                  1..25
                        mol_type = other DNA
                        organism = synthetic construct
SEQUENCE: 16
ccaggatgcc cttgagggg ccctc                                              25
```

The invention claimed is:

1. An Hypoxia-Inducible Factor-1 (HIF-1) activator comprising olive leaf extract, the olive leaf extract including both oleuropein or its derivative and oleuroside or its derivative as active ingredients, wherein oleuropein or its derivative and oleuroside or its derivative are present at 10:1 to 1:10 (weight ratio), and wherein the olive leaf extract contains oleuropein or its derivative at 1.59% or more and oleuroside or its derivative at 0.5% or more.

2. The HIF-1 activator according to claim 1, which is for maintaining the undifferentiated state of stem cells via HIF-1 activation and/or improving dysdifferentiation of stem cells.

3. The HIF-1 activator according to claim 1, which is for inducing and/or promoting differentiation of pluripotent stem cells or multipotent stem cells via HIF-1 activation.

4. The HIF-1 activator according to claim 1, which is for maintaining the undifferentiated state of pluripotent stem cells or multipotent stem cells via HIF-1 activation, and/or promoting their self-replication.

5. The HIF-1 activator according to claim 3, wherein the pluripotent stem cells are selected from the group consisting of somatic stem cells, embryonic stem cells (ESC), induced pluripotent stem cells (iPSC) and embryonic germ cells (EGC).

6. The HIF-1 activator according to claim 5, wherein the somatic stem cells are selected from the group consisting of hematopoietic stem cells, skin stem cells, epidermal stem cells, dermal stem cells, neural stem cells, mesenchymal stem cells, hepatic stem cells and pancreatic stem cells.

7. The HIF-1 activator according to claim 1, which is for treatment, prevention, alleviation, improvement or recovery from a disease or symptom associated with reduced HIF-1 activity.

8. The HIF-1 activator according to claim 7, wherein the disease or symptom is selected from the group consisting of diseases or symptoms associated with hematopoietic dysfunction, diseases or symptoms associated with hypoxia response dysfunction, diseases or symptoms associated with impaired vascularization ability, ischemic brain disease and ischemic heart disease.

9. The HIF-1 activator according to claim 1, which is for promoting and/or improving hematopoiesis, vascularization, vascular function, iron metabolism homeostasis and oxygen transportability.

10. The HIF-1 activator according to claim 1, which is for treatment, prevention, alleviation and/or improvement of a symptom selected from the group consisting of anemia, iron deficiency, irregular menstruation, breathlessness, fatigue, malaise, dizziness, lightheadedness, heavyheadedness, headache, skin tone darkening and hypobaropathy, by increased oxygen transportability associated with increased erythrocytes based on activation of hematopoietic stem cells by HIF-1 activation.

11. The HIF-1 activator according to claim 1, which is for treatment, prevention, alleviation and/or improvement in a symptom selected from the group consisting of poor blood circulation, blood stagnation, dull complexion, menstrual pain, nail abnormality, restless leg syndrome, swelling, low back pain, shoulder stiffness, arthralgia, cold sensitivity, alopecia, delayed wound healing, constipation, dark eye circles, skin spots, wrinkles, reduced skin elasticity, impaired skin barrier function and blushing, which is associated with improved vascularization and vascular function based on activation of stem cells by HIF-1 activation.

12. The HIF-1 activator according to claim 1, which is for improvement of a symptom selected from the group consisting of skin aging, sarcopenia, osteoporosis, osteoarthritis and brain aging, based on activation of stem cells by HIF-1 activation.

13. The HIF-1 activator according to claim 1, which is for treatment, prevention, alleviation and/or improvement in a symptom selected from the group consisting of brain aging associated with increased age or reduced cerebral blood flow, cognitive decline, impaired memory, forgetfulness, mild cognitive impairment, dementia, poor concentration, age-associated brain atrophy, reduced cranial neuronal ATP levels, decreased neurogenesis, Creutzfeldt-Jakob disease, Alzheimer's disease, Huntington's disease, Lewy body disease, Parkinson's disease, Pick's disease, amyotrophic lateral sclerosis, neurofibromatosis, epilepsy, brain damage, stroke, multiple sclerosis, ischemic hypoxia, spinal cord injury, loss of memory and multi-infarct dementia, based on activation of neural stem cells by HIF-1 activation.

14. A pharmaceutical composition comprising an HIF-1 activator according to claim 1.

15. A cosmetic comprising an HIF-1 activator according to claim 1.

16. A food composition comprising an HIF-1 activator according to claim 1.

17. The HIF-1 activator according to claim 1, wherein the olive extract contains oleuropein at 4% or more.

18. The HIF-1 activator according to claim 1, wherein oleuropein or its derivative and oleuroside or its derivative are present at 7:1 to 10:1 (weight ratio).

19. The HIF-1 activator according to claim 1, wherein oleuropein or its derivative and oleuroside or its derivative are present at 1:1 to 10:1 (weight ratio).

20. The HIF-1 activator according to claim 1, wherein oleuropein or its derivative and oleuroside or its derivative are present at ratio selected from the group consisting of 10:1, 9:1, 8:1, 7:1, 6:1, 5:1, 4:1, 3:1, 2:1, and 1:1 (weight ratio).

21. An Hypoxia-Inducible Factor-1 (HIF-1) activator comprising olive leaf extract, the olive leaf extract including both oleuropein or its derivative and oleuroside or its derivative as active ingredients, wherein oleuropein or its derivative and oleuroside or its derivative are present at 100:1 to 1:100 (weight ratio), and wherein the olive leaf extract contains oleuropein or its derivative at 1.59% or more and oleuroside or its derivative at 0.5% or more.

22. The HIF-1 activator according to claim 21, wherein oleuropein or its derivative and oleuroside or its derivative are present at ratio selected from the group consisting of 30:1, 20:1, 15:1, and 1:50, and 1:100 (weight ratio).

* * * * *